United States Patent [19]
Bach et al.

[11] Patent Number: 6,141,660
[45] Date of Patent: Oct. 31, 2000

[54] COMMAND LINE INTERFACE FOR CREATING BUSINESS OBJECTS FOR ACCESSING A HIERARCHICAL DATABASE

[75] Inventors: Mark A. Bach, San Jose; Kyle Jeffrey Charlet, Morgan Hill; Shyh-Mei Fang Ho, Cupertino; Kevin M. McBride, Menlo Park; Huey Moncrief Rowe-Anderson, San Jose; Thomas Beavers Sander, Saratoga; Thomas Arthur Vogel, San Jose, all of Calif.

[73] Assignee: International Business Machines Corporation, Armonk, N.Y.

[21] Appl. No.: 09/118,130

[22] Filed: Jul. 16, 1998

[51] Int. Cl.$^7$ ........................................ G06F 17/30
[52] U.S. Cl. ..................... 707/103; 707/102; 395/702; 345/352
[58] Field of Search ................... 707/102, 103, 707/104; 395/702; 345/352

[56] References Cited

U.S. PATENT DOCUMENTS

| | | |
|---|---|---|
| 5,161,225 | 11/1992 | Abraham et al. . |
| 5,212,787 | 5/1993 | Baker et al. . |
| 5,235,701 | 8/1993 | Ohler et al. . |
| 5,291,583 | 3/1994 | Bapat . |
| 5,295,256 | 3/1994 | Bapat . |

(List continued on next page.)

OTHER PUBLICATIONS

Muckenhaupt, Kenneth J., "Preserving Current Assets With Objects on MVS White Paper," Mar. 15, 1996, at http://www.s390.ibm.com/products/wp/wrapwp.html.

"The Essential Distributed Objects Survival Guide—Chapter 8 CORBA Services: Persistence and Object Databases," at http://koh.kyungpook.ac.kr/members/gwh/ai8.html. Date unknown.

IBM Corporation. "IMS is an Object Oriented World," San Jose, California, Jul. 12, 1995 pp. 1–53.

Howe III, Jack L., "IMS/OO—Overview: Objects in IMS Are Closer Than They Appear", IBM Corporation, Overheads from presentation at SHARE '95, Feb. 23, 1995.

Howe III., Jack L., "Objects in the IMS are Closer Than They Appear", IBM Corporation, Overheads from presentation at IBM Technical Interchange '95, May 20, 1995.

"Voyager/C++ Client/Server Object Management System," Secant Technologies, Inc., 1995.

Ho, Shyh–Mei, "Object Access To IMS Data," IMS OO–Web Design/Development, IBM Santa Teresa Laboratory, San Jose, California, Overheads from presentation at SHARE '97, Mar. 1997.

*Primary Examiner*—Thomas G. Black
*Assistant Examiner*—Jean M. Corrielus
*Attorney, Agent, or Firm*—Gates & Cooper

[57] ABSTRACT

A method, apparatus, and article of manufacture for generating class specifications for an object-oriented application that accesses a hierarchical database. The class specifications are generated using a command line interface of a class definition tool. A database description and a record layout associated with the hierarchical database are captured and associated to define a specification for the database. Class definitions are then generated from the database specification, wherein the class definitions are instantiated as objects in the objects framework that encapsulate data retrieved from the database.

30 Claims, 20 Drawing Sheets

U.S. PATENT DOCUMENTS

| | | |
|---|---|---|
| 5,297,279 | 3/1994 | Bannon et al. |
| 5,303,379 | 4/1994 | Khoyi et al. |
| 5,379,419 | 1/1995 | Heffernan et al. |
| 5,414,812 | 5/1995 | Filip et al. |
| 5,421,015 | 5/1995 | Khoyi et al. |
| 5,426,747 | 6/1995 | Weinreb et al. |
| 5,437,027 | 7/1995 | Bannon et al. |
| 5,459,860 | 10/1995 | Burnett et al. |
| 5,499,371 | 3/1996 | Henninger et al. |
| 5,542,078 | 7/1996 | Martel et al. |
| 5,581,756 | 12/1996 | Nakabayashi. |
| 5,613,099 | 3/1997 | Erickson et al. |
| 5,627,979 | 5/1997 | Chang et al. |
| 5,737,597 | 4/1998 | Blackman et al. ...... 707/102 |
| 5,737,598 | 4/1998 | Blackman et al. ...... 707/102 |
| 5,761,671 | 6/1998 | Blackman et al. ...... 707/103 |
| 5,764,979 | 6/1998 | Blackman et al. ...... 707/102 |
| 5,765,161 | 6/1998 | Blackman et al. ...... 707/103 |
| 5,765,162 | 6/1998 | Blackman et al. ...... 707/103 |
| 5,765,163 | 6/1998 | Blackman et al. ...... 707/103 |
| 5,778,358 | 7/1998 | Blackman et al. ...... 707/3 |
| 5,778,379 | 7/1998 | Blackman et al. ...... 707/103 |
| 5,781,739 | 7/1998 | Bach et al. ...... 709/227 |
| 5,781,907 | 7/1998 | Blackman et al. ...... 707/103 |
| 5,787,436 | 7/1998 | Blackman et al. ...... 707/103 |
| 5,794,247 | 8/1998 | Blackman et al. ...... 707/103 |
| 5,794,248 | 8/1998 | Blackman et al. ...... 707/103 |
| 5,799,313 | 8/1998 | Blackman et al. ...... 707/103 |
| 5,809,508 | 9/1998 | Blackman et al. ...... 707/103 |
| 5,809,509 | 9/1998 | Blackman et al. ...... 707/103 |
| 5,878,411 | 3/1999 | Burroughs et al. ...... 707/4 |
| 5,924,101 | 7/1999 | Bach et al. ...... 707/103 |
| 5,956,730 | 9/1999 | Burroughs et al. ...... 707/104 |
| 6,002,874 | 12/1999 | Bahrs et al. ...... 395/705 |
| 6,018,743 | 1/2000 | Xu ...... 707/103 |

COMMAND LINE INTERFACE FOR CREATING BUSINESS OBJECTS FOR ACCESSING A HIERARCHICAL DATABASE

CROSS-REFERENCE TO RELATED APPLICATIONS

This application is related to the following co-pending and commonly assigned patent applications:

Utility Application Ser. No. 09/097,376, entitled "AN OBJECT-ORIENTED PARADIGM FOR ACCESSING TRANSACTIONAL REQUESTS BY MODELING I/O MESSAGE QUEUES INTO AN OBJECT FRAMEWORK," filed on Jun. 15, 1998, by Bach Dinh Doan, Shyh-Mei Fang Ho, and Jenny Y. Liao, attorney's docket number ST9-98-056;

Utility Application Ser. No. 09/070,071, entitled "AN EXECUTION PARADIGM FOR ACCESSING HIERARCHICAL DATA USING AN OBJECT FRAMEWORK," filed on Apr. 30, 1998, by Kenneth R. Blackman, Shyh-Mei F. Ho, and Thomas Beavers Sander, attorney's docket number ST9-98-005;

Utility Application Ser. No. 09/070,274, entitled "A GENERIC EXECUTION MODEL FOR ISOLATING APPLICATIONS FROM UNDERLYING DATABASES," filed on Apr. 30, 1998, by Kenneth R. Blackman, Shyh-Mei F. Ho, and Thomas Beavers Sander, attorney's docket number ST9-98-006;

Utility Application Ser. No. 09/070,528, entitled "AN OBJECT-ORIENTED PROGRAMMING MODEL FOR ACCESSING HIERARCHICAL DATABASES," filed on Apr. 30, 1998, by Bach Dinh Doan and Shyh-Mei F. Ho, attorney's docket number ST9-98-007;

Utility Application Ser. No. 09/070,273, entitled " AN INTERNET-ENABLED GENERIC APPLICATION PROGRAM FOR ACCESSING HIERARCHICAL DATA," filed on Apr. 30, 1998, by Bach Dinh Doan and Shyh-Mei F. Ho, attorney's docket number ST9-98-027;

Utility Application Ser. No. 09/070,227, entitled "GENERATING AN INTERNET APPLICATION FOR ACCESSING A HIERARCHICAL DATABASE," filed on Apr. 30, 1998, by Attila J. Fogarasi, Shyh-Mei F. Ho, Wai-Yee D. Ling, and Kevin M. McBride, attorney's docket number ST9-98-028;

Provisional Application Ser. No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, attorney's docket number ST9-97-126;

Utility Application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, attorney's docket number ST9-97-126, which claims the benefit under 35 U.S.C. §119(e) of Provisional Application Ser. No. 60/067,292 above;

Utility Application Ser. No. 08/949,638, entitled "A USER INTERFACE FOR CREATING CLASS DEFINITIONS AND IMPLEMENTATIONS FOR DATABASE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, now U.S. Pat. No. 5,924,101;

Utility Application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739;

Utility Application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313;

Utility Application Ser. No. 08/736,763, entitled "A METHOD FOR REPRESENTING NON-OBJECT-ORIENTED DATABASES USING A COLLECTION OF COLLECTIONS DATA MODEL," filed on Oct. 25, 1996, by Kenneth R. Blackman and Jack L. Howe III, attorney's docket number now U.S. Pat. No. 5,794,248;

Utility Application Ser. No. 08/738,294, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on Oct. 25, 1996, by Kenneth R. Blackman and Jack L. Howe III, now U.S. Pat. No. 5,781,907;

Utility Application Ser. No. 08/738,104, entitled "A QUERY SYNTAX FOR ACCESSING NON-RELATIONAL, NON-OBJECT-ORIENTED DATABASES," filed on Oct. 25,1996, by Kenneth R. Blackman and Jack L. Howe III, now U.S. Pat. No. 5,788,379;

Utility Application Ser. No. 08/738,082, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,788,358;

Utility Application Ser. No. 08/738,330, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III, now U.S. Pat. No. 5,787,436;

Utility Application Ser. No. 08/736,759, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, now U.S. Pat. No. 5,794,247;

Utility Application Ser. No. 08/736,764, entitled "A METHOD FOR ENCAPSULATING DATA FROM NON-OBJECT-ORIENTED DATABASES AS DATABASE PERSISTENT OBJECTS," filed on Oct. 25, 1996, by Kenneth R. Blackman and Jack L. Howe III, now U.S. Pat. No. 5,765,161;

Utility Application Ser. No. 08/738,103, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III, now U.S. Pat. No. 5,765,163;

Utility Application Ser. No. 08/736,983, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R. Blackman and Jack L. Howe III, now U.S. Pat. No. 5,761,671;

Utility Application Ser. No. 08/736,952, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III, now U.S. Pat. No. 5,765,162;

Utility Application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597;

Utility Application Ser. No. 09/047,786, entitled "A METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, which is a continuation of Utility Application Ser. No. 08/736,765 now U.S. Pat. No. 5,737,597 above;

Utility Application Ser. No. 08/736,922, entitled "A METHOD FOR CAPTURING AND CATALOGING DATABASE CHARACTERISTICS TO DEFINE DATABASE PERSISTENT OBJECTS," filed on Oct. 25, 1996, by Kenneth R. Blackman and Jack L. Howe III, now U.S. Pat. No. 5,809,508;

Utility Application Ser. No. 08/738,102, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III, now U.S. Pat. No. 5,737,598;

Utility Application Ser. No. 08/738,105, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III, now U.S. Pat. No. 5,809,509; and Utility Application Ser. No. 08/736,761, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III, now U.S. Pat. No. 5,764,979;

all of which applications are incorporated by reference herein.

BACKGROUND OF THE INVENTION

1. Field of the Invention

The present invention relates generally to computerized methods for accessing databases, and in particular, to a method for generating an application for accessing a hierarchical database using an object-oriented framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrappering, implemented in such products such as IBM's VisualAge™ IMS Connection. Transaction wrappering creates a class having methods that retrieve data from the IMS™ database, create an object embodying the retrieved data, and manipulate the object in an object-oriented application program. The problem with this approach is that each object-oriented application requires substantial additional coding, both object-oriented and non-object-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMS™ database, does not map well to a relational database.

Thus, there is a need in the art for improved techniques for accessing hierarchical data using object-oriented frameworks. Moreover, such techniques should minimize the effort involved in developing new application programs.

SUMMARY OF THE INVENTION

To overcome the limitations in the prior art described above, and to overcome other limitations that will become apparent upon reading and understanding the present specification, the present invention discloses a method, apparatus, and article of manufacture for generating class specifications for an object-oriented application that accesses a hierarchical database. The class specifications are generated using a command line interface of a class definition tool. A database description and a record layout associated with the hierarchical database are captured and associated to define a specification for the database. Class definitions are then generated from the database specification, wherein the class definitions are instantiated as objects in the objects framework that encapsulate data retrieved from the database.

Various advantages and features of novelty, which characterize the invention, are pointed out with particularity in the claims annexed hereto and form a part hereof However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a method for generating class specifications for an object-oriented application program that accesses a hierarchical database. The class specifications are generated using a command line interface of a class definition tool. The class definition tool parses database files and generates class definitions for objects that encapsulate or wrapper data retrieved from the database. The class definition tool also automatically generates input forms and output pages (for example, HTML or XML forms and pages) that are displayed on web browsers that interact with the application program and objects framework.

The object-oriented application program thus generated accesses a hierarchical database, such as an IMS™ database, using an objects framework that models the database and provides the mechanisms that allow the object-oriented application program to access the database data using standard tools, such as the DL/I™ query language for the IMS™ database. The objects framework instantiates IMS™ data objects upon demand from the application program and manages those objects from creation to deletion. Further, the objects framework uses these objects to dynamically construct DL/I™ calls from application program requests.

The application program and objects framework can be used in a number of different environments, such as: (1) DL/I™ batch processing and (2) on-line transactions including both IMS™ and CICS™ transactions. Moreover, the application program and objects framework can be executed in any MVS address space, including IMS™ and non-IMS™ address spaces, such as web server address spaces.

Hardware Environment

Figure 1:
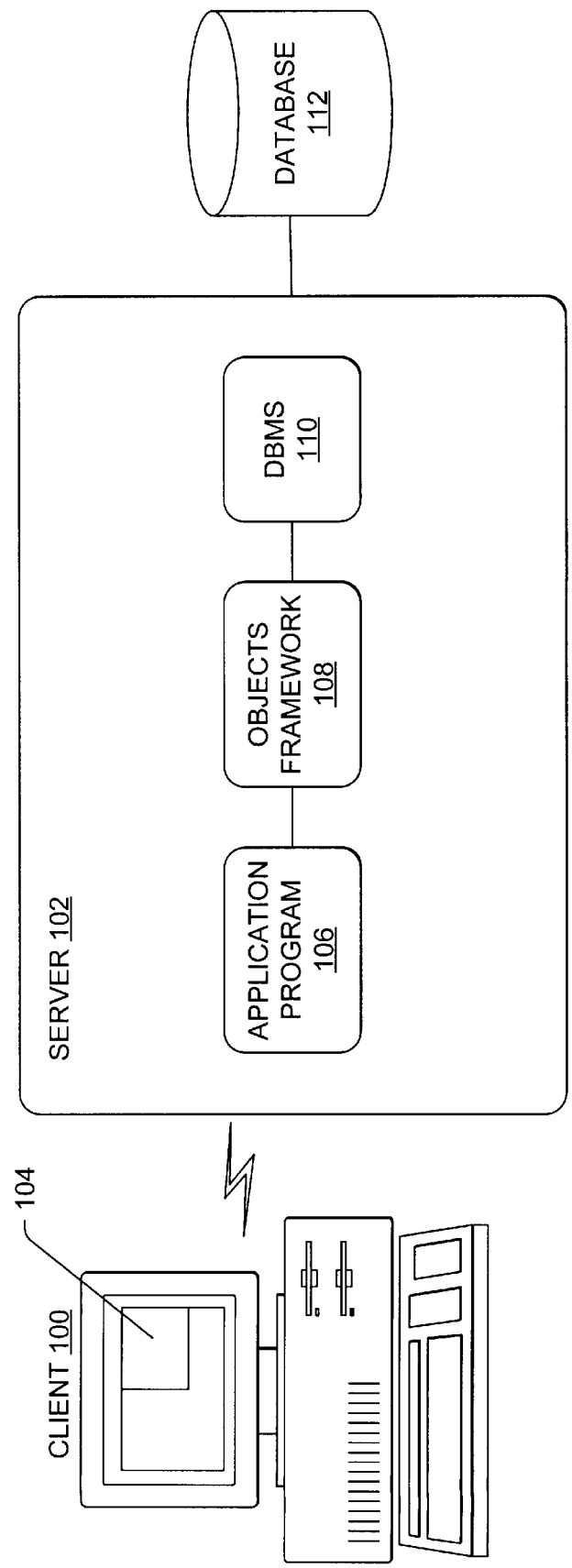
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
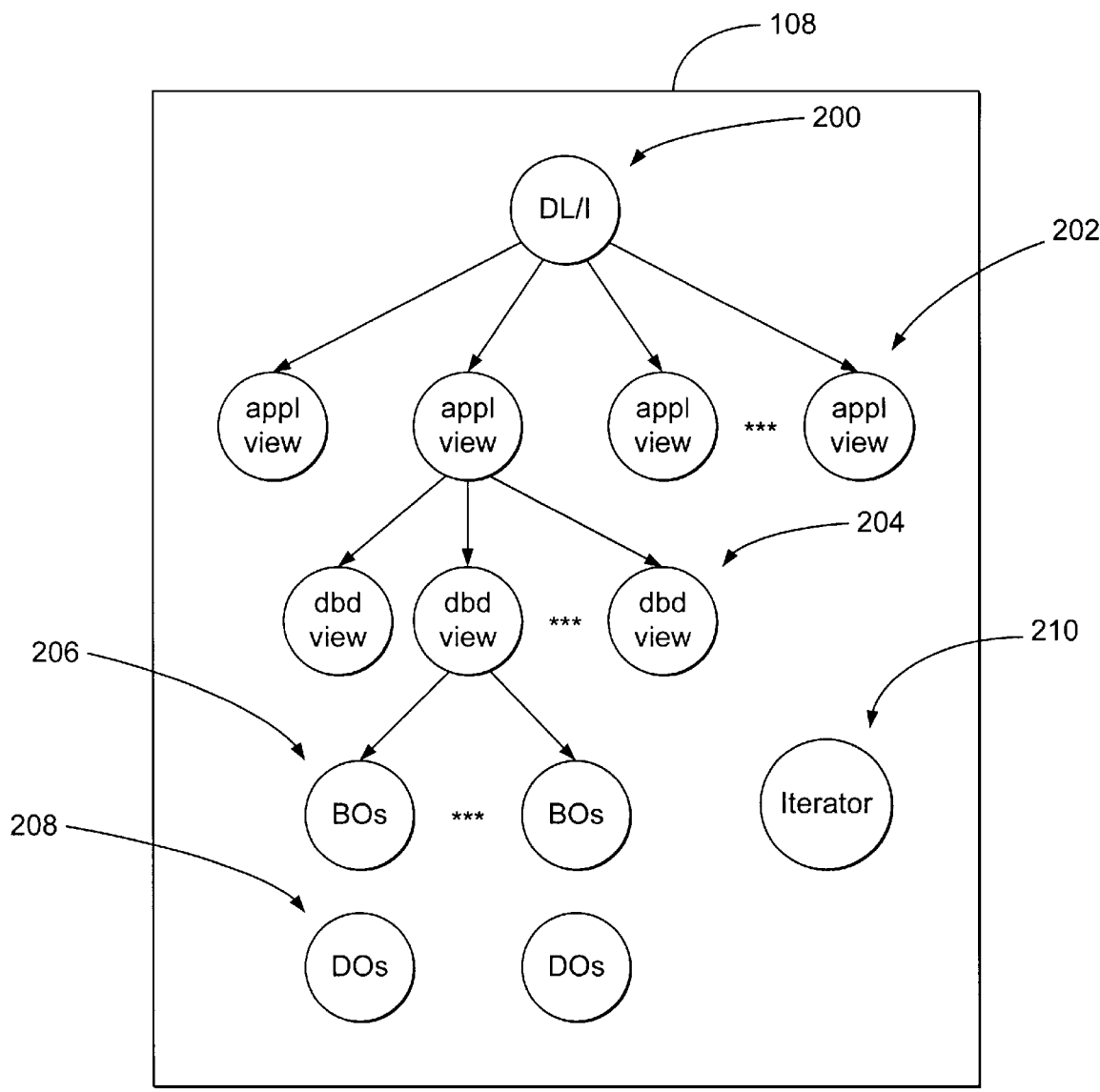
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, and an iterator object 210.

The application program 106 first loads the objects framework 108 class library by instantiating a DL/I™ object 200, one applView object 202, and one dbdView object 204. The objects framework 108 then dynamically loads the class library for the BOs 206 and DOs 208 requested by the application program 106 to create an iterator object 210. The iterator object 210 then instantiates the BOs 206 and their corresponding DOs 208 during execution.

All the class objects, except the iterator class 210, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each appiView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of segments in the IMS™ database 112 as well as the record layouts, including formatting information, for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A data object (DO) 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a business object (BO) 206 may be instantiated with a DO 208 to provide business logic for the application program 106. In such an embodiment, the application program 106 accesses the business logic via the BO 206, which in turns invokes the methods of its corresponding DO 208 to perform the necessary operations on the database 112 to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the application program 106 uses a DL/I™ query string to access the IMS™ database 112. After the application program 106 receives and parses the user input, it first instantiates a desired applView object 202. If the associated DL/I™ object 200 has not been instantiated yet, this also results in its instantiation as the root of the objects framework 108 and the root for the collection of application views (applView objects 202) in the IMS™ database 112. The application program 106 then provides the DL/I™ query string to an "evaluate" method of the applView object 202. The applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 104. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using methods of the BOs 206. The BO 206 will, in turn, invoke the methods of its corresponding DO 208 to perform actual DL/I calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS ( )
UpdateToDS ( )
InsertToDS ( )
DeleteFromDS ( )

In a preferred embodiment, only the above four methods will result in actual I/O operations on the database 112.

Example Application Program

Following is a sample object-oriented application program 106 according to the present invention:

// application program
main ( )

```
{
    // instantiate desired applView object (and DL/I object if necessary)
    applView_SSM applView("applViewName");
    // instantiate iterator and set object pointer using applView object's
    // "evaluate" method and query string
    iterator* ltr = applView.evaluate(queryString);
    // use "next" method to instantiate a BO and its associated DO
    BO*pObj = ltr-> next( );
    // use indicated methods to retrieve, update, or
    // delete BOs and DOs
    pObj-> RetrieveFromDS( );
    pObj-> UpdateToDS( );
    pObj-> DeleteFromDS( );
    // use "newObject" method to instantiate new DO
    DO*pObj = ltr-> newObject( );
    // use indicated method to insert new DO
    pObj-> InsertToDS( );
}
```

Following is a example DL/I™ query string that could be used by the object-oriented application program 106 to retrieve DOs 208 from the database 112:

SELECT doClassNameC
FROM databaseViewName
WHERE doClassNameA.keyname relop keyvalue,
  doClassNameB.keyname relop keyvalue,
  doClassNameC.keyname relop keyvalue where "relop" is a relational operator, such as:

EQ or=or=
GT or>or>
LT or<or<
GE or>=or=>
LE or<=or=<
NE or !=or=!
AND or & or*
OR or | or+

Logic of the Application Program

Figure 3:
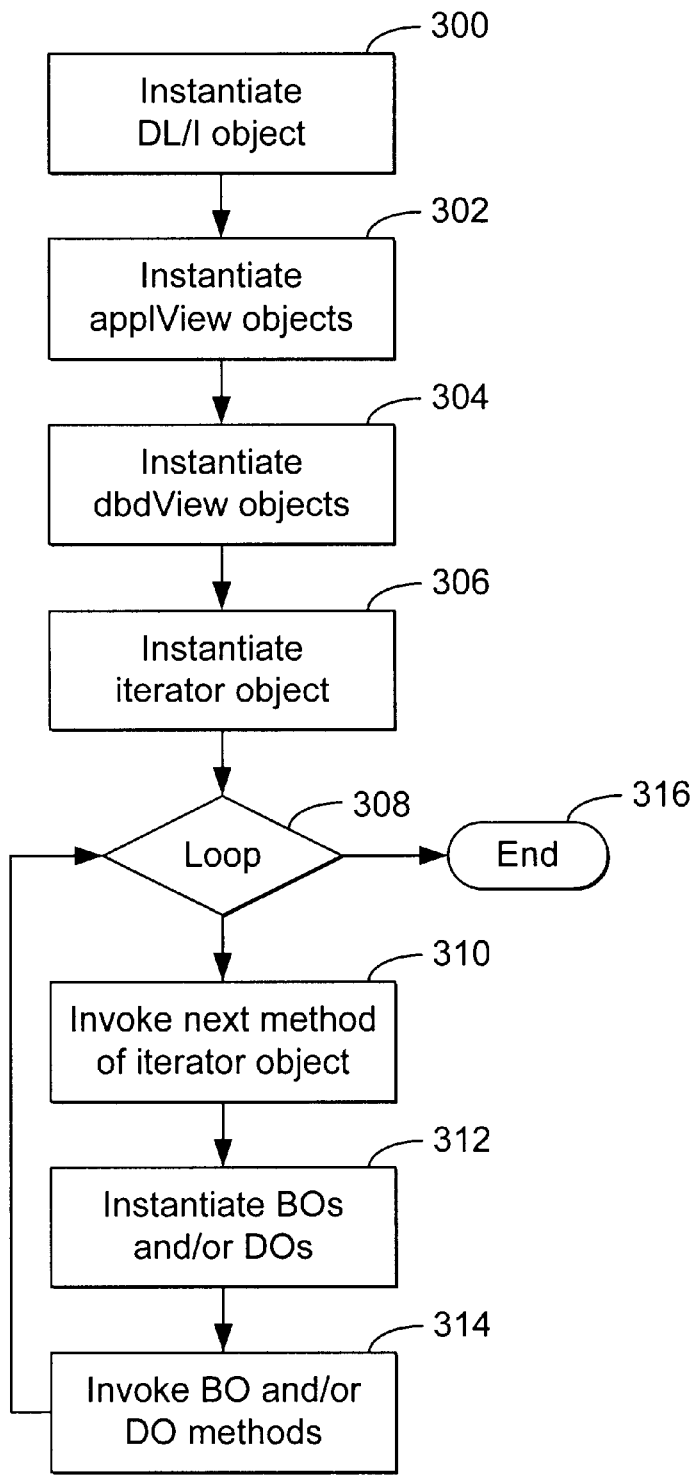
FIG. 3 is a flowchart illustrating the steps performed by the application program and objects framework according to the present invention.

FIG. 3 is a flowchart illustrating the steps performed by the application program 106 and objects framework 108 according to the present invention.

Block 300 represents the DL/I™ object 200 of the objects framework 108 being instantiated in the memory of the server computer 102. Usually, this occurs either when the objects framework 108 is loaded or when the application program 106 first requests an appiView object 202.

Block 302 represents the application program 106 instantiating the requested applView object 202 in the memory of the server computer 102.

Block 304 represents the dbdView objects 204 of the objects framework 108 being instantiated in the memory of the server computer 102. Usually, this occurs either when the objects framework 108 is loaded or when the application program 106 first requests an applView object 202.

Block 306 represents the application program 106 instantiating the iterator object 210 in the memory of the server computer 102 and setting its object pointer by invoking the "evaluate" method with a DL/I™ query string.

Blocks 308–316 represent a loop that may be performed by the application program 108 to iterate through all the associated DOs 208 and/or BOs 206 in the collection.

Block 310 represents the application program 106 invoking the "next" member function or method of the iterator object 210 to instantiate/materialize the next DO 208 and/or BO 206 in the memory of the server computer 102.

Block 312 represents the iterator object 210 instantiating the requested DO 208 and/or BO 206 in the memory of the server computer 102.

Block 314 represents the application program 106 invoking the "getter", "setter", or other methods of the BOs 206 and/or DOs 208 to perform the desired functionality. Thereafter, control transfers back to Block 308.

Block 316 represents the end of the logic.

Class Definition Tool (CDT)

Figure 4:
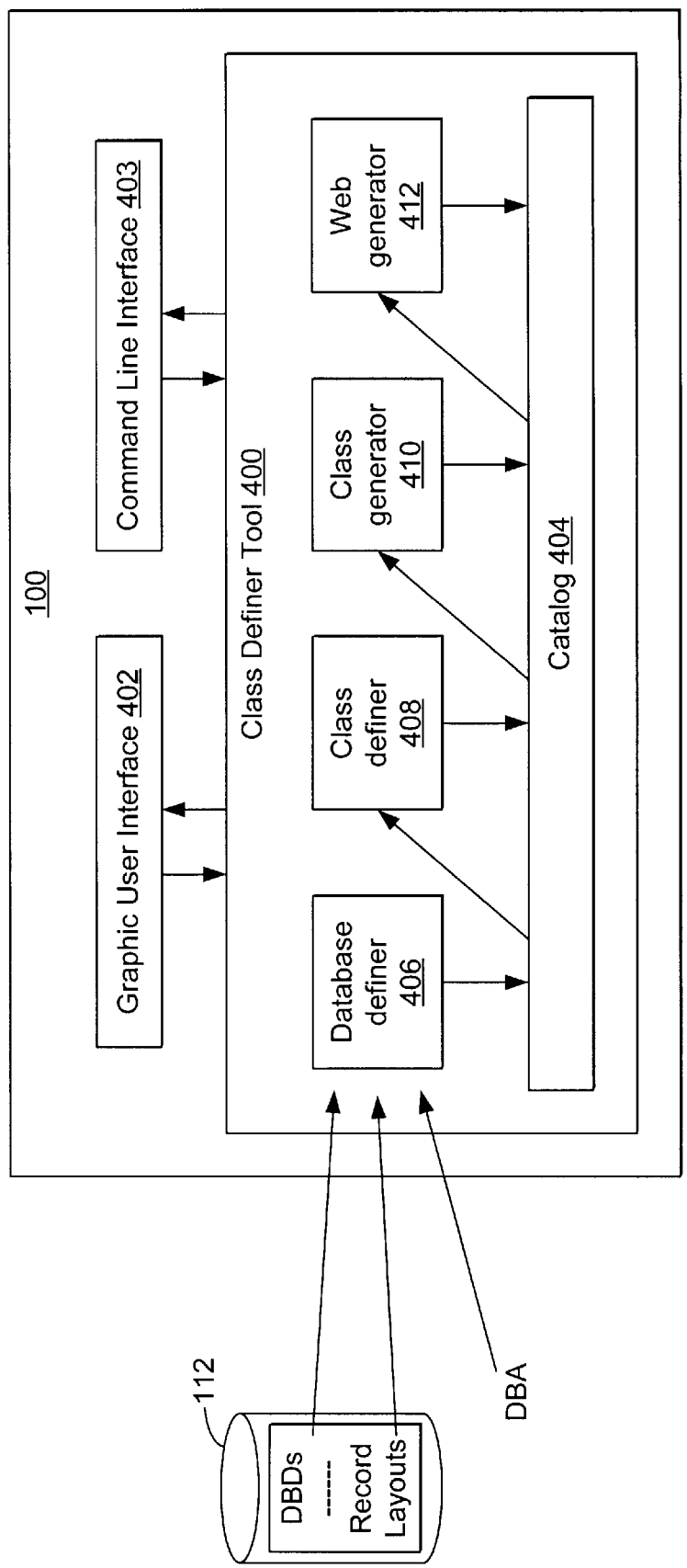
FIG. 4 is a block diagram illustrating the structure of a Class Definition Tool according to the present invention.
Figure 5:
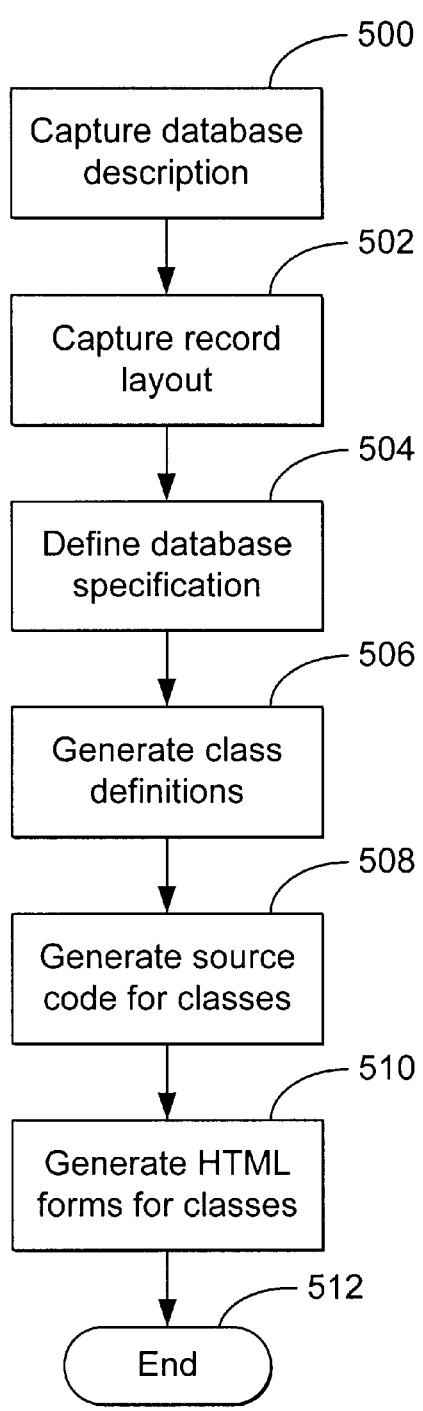
FIG. 5 is a flowchart illustrating the logic performed by the Class Definition Tool according to the present invention.

FIG. 4 is a block diagram illustrating the structure of a Class Definition Tool (CDI) 400 according to the present invention, and FIG. 5 is a flowchart illustrating the logic performed by the CDT 400 according to the present invention. The CDT 400 executes under the control of the operating system on the client computer 100, interacts with an operator via a Graphical User Interface (GUI) 402 and/or a Command Line Interface (CLI) 403, and stores information in a catalog 404.

To minimize the need for writing non-object-oriented code to access the database 112, the object classes and methods used in the objects framework 108 are generated by the CDT 400. Generally, these classes and methods are typically generated as C++ source code, although other programming languages could be used as well. Using the object framework 108 as its runtime component, the application program 106 instantiates objects for these classes and directs the retrieval of data from the database 112 into the instantiated objects.

A database definer function 406 of the CDT 400 captures information from a database description (500) and the record layout for the database 112 (502), and associates them to one another to define a database specification (504), which is subsequently stored in the catalog 404.

The database descriptions and record layouts accessed by the CDT 400 are typically located on a host system, e.g., the server computer 102, and downloaded to the client computer 100. The database description includes information about the structure of the segments in the database 112 and the record layouts include formatting information for the records in the database 112.

Generally, the database definer function 406 can either be done automatically by the CDT 400 or in response to commands from a Database Administrator (DBA). The resulting database specification contains the relevant information extracted from the database description and the record layout, and links the database description and record layout together. The database definer function 406 may further perform an augment function that captures additional information to assist in defining the database specification.

A class definer function 408 of the CDT 400 uses the database specification in the catalog 404 and operator input to generate class definitions for the various objects (506), which are then stored in the catalog 404. The class definer function 408 may further perform an augment function that captures additional information to assist in generating the class definitions and to constrain the use of the resulting objects.

A class generator function 410 of the CDT 400 uses the class definitions to generate source code (508), which includes both class and method implementations. The source code generated by the CDT 400 is compiled, linked, and made available in executable form at run-time as the objects framework 108 on the server computer 102.

A web generator function 412 of the CDT 400 also uses the database specification in the catalog 404 and operator input to generate input and output forms (510) for display to a web browser. Using the forms, a web browser can interface to an Internet-enabled application program 106 to retrieve, update, delete and add data to and from the IMS™ databases.

Operation of the IMS™ Object Connector Class Graphical User Interface

FIGS. 6A–6L are "snapshots" of an IMS™ Object Connector Class Wizard, also known descriptively as a "task guide", that comprises at least a portion of the IMS™ Object Connector Class GUI 402 displayed on the monitor of the client computer 100 by the CDT 400 in one embodiment of the present invention. These snapshots illustrate an exemplary sequence of events during the operation of the IMS™ Object Connector Class Wizard 402.

The IMS™ Object Connector Class Wizard 402 of the present invention provides an improved GUI for the CDT 400. The IMS™ Object Connector Class Wizard 402 simplifies the creation and/or use of the Catalog 404. As a result, the IMS™ Object Connector Class Wizard 402 improves application programmer productivity.

The IMS™ Object Connector Class Wizard 402 is displayed whenever the CDT 400 is executed. The CDT 400 displays an initial page for the IMS™ Object Connector Class Wizard 402, as shown in FIG. 6A.

Figure 6A:
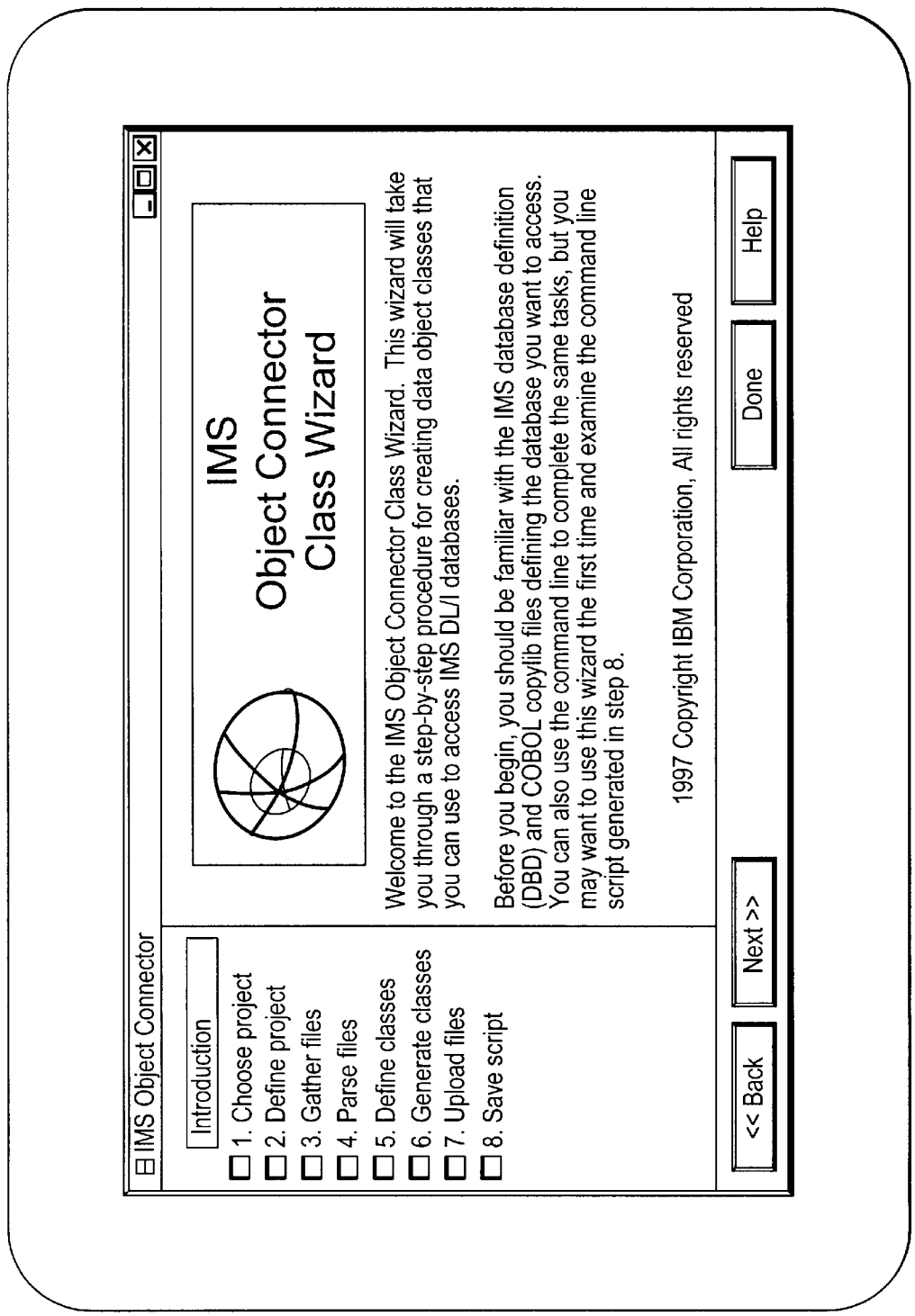
FIGS. 6A–6L are "snapshots" of an IMS™ Object Connector Class Wizard, also known descriptively as a "task guide", that comprises at least a portion of the graphical user interface displayed on the monitor of the client computer by the Class Definition Tool in one embodiment of the present invention.

The initial page of FIG. 6A is an introduction page for the IMS™ Object Connector Class Wizard 402. This page is the beginning of a step-by-step procedure for creating the catalog 404. Along the left side of the page are checkboxes, wherein the checkboxes are "checked" as each step is completed. Prior to beginning the steps, the operator should be familiar with the IMS™ database definition (DBD) files and COBOL copylib files defining the targeted IMS™ database 112.

The page includes four buttons, including the Back, Next, Done, and Help buttons, which perform the following functions: (1) return to the previous step by selecting the Back button; (2) proceed to the next step by selecting the Next button; (3) terminate the Wizard by selecting the Done button; and (4) display "Help" information by selecting the Help button.

Figure 6B:
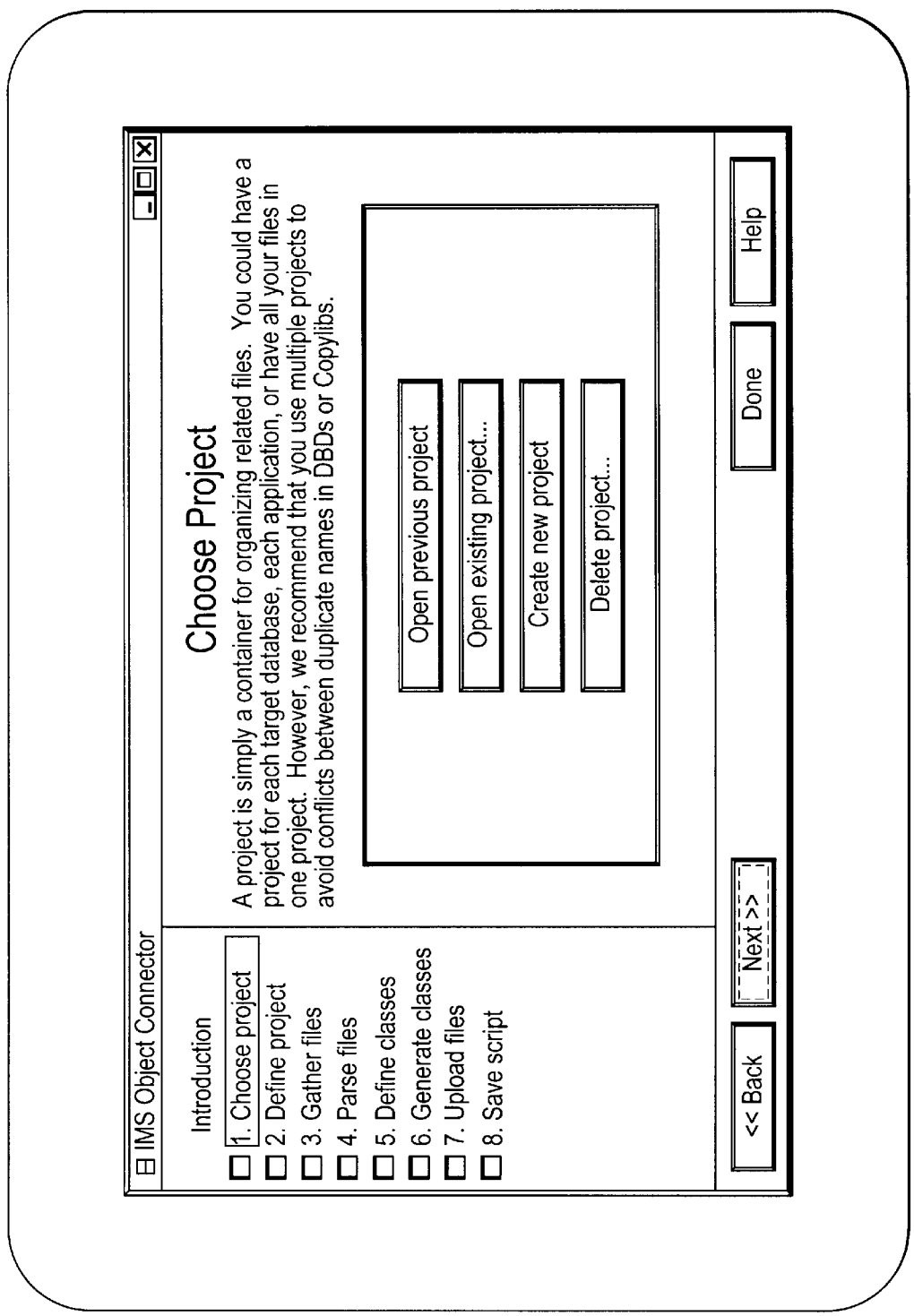

After selecting the Next button, the "Choose Project" page of FIG. 6B is displayed on the monitor of the client computer 100. A project is a folder or container within the catalog 404 for organizing related files. The user could have a project for each target database, each application, or one project for all files. Generally, the user should use multiple projects to avoid conflicts between duplicate names in the DBDs or COBOL copylibs.

The page includes eight buttons, including the Open previous project, Open existing project, Create new project, Delete project, Back, Next, Done, and Help buttons, which perform the following functions: (1) open a previous project; (2) open an existing project; (3) create a new project; (4) delete a project; (5) return to the previous step by selecting the Back button; (6) proceed to the next step by selecting the Next button; (6) terminate the Wizard by selecting the Done button; and (8) display "Help" information by selecting the Help button.

Figure 6C:
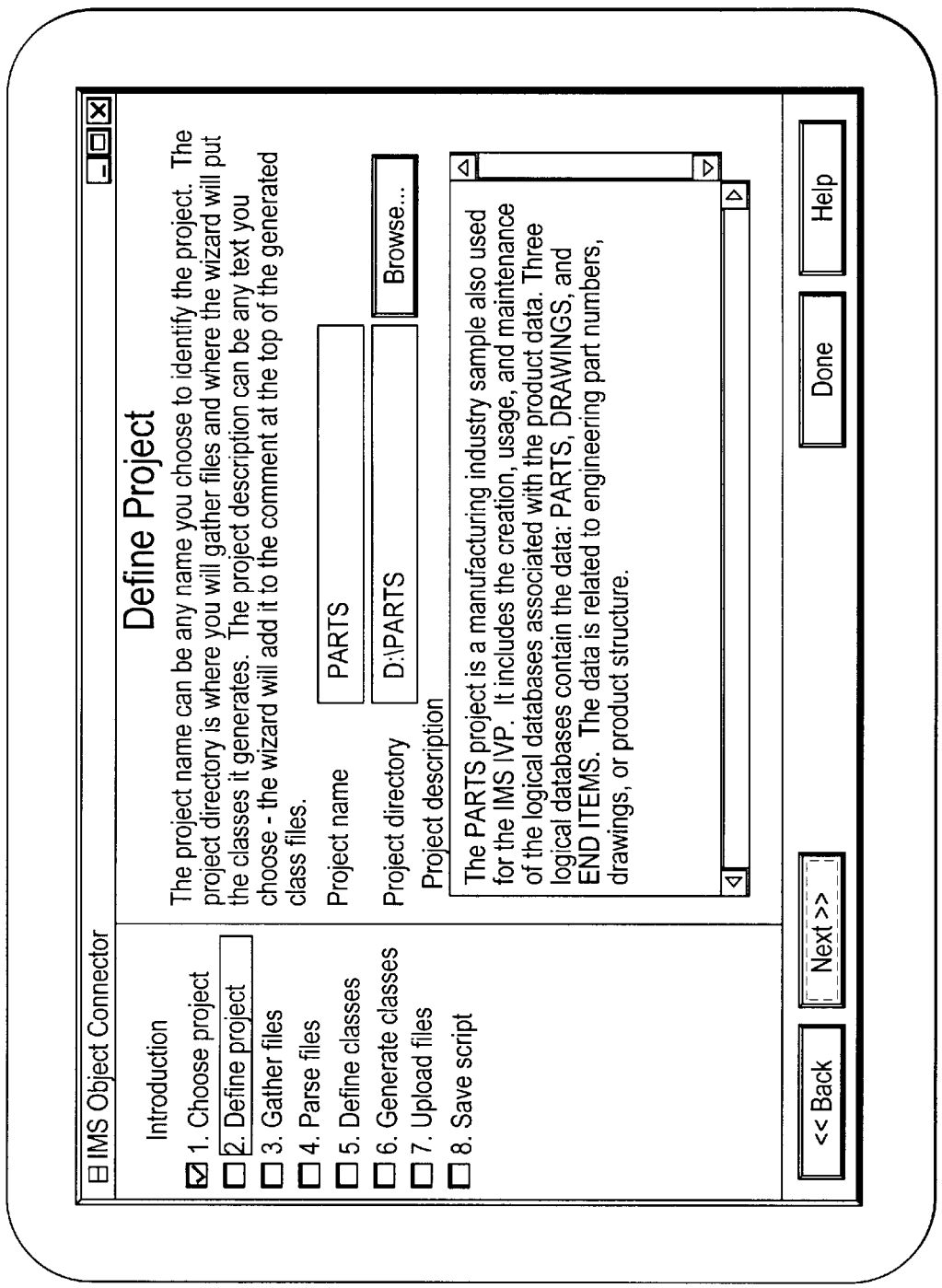

After selecting the Next button, the "Define Project" page of FIG. 6C is displayed on the monitor of the client computer 100. This page is used by the user to define the project name, project directory, and project description. The project name is any name used to identify the project; the project directory is a subdirectory where the files for the project are gathered; and the project description is any text chosen by the user, wherein the text is added to the top of the generated class source code.

The page includes three fields for specifying the project name, project directory, and project description, and four buttons, including the Back, Next, Done, and Help buttons, which perform the following functions: (1) return to the previous step by selecting the Back button; (2) proceed to the next step by selecting the Next button; (3) terminate the Wizard 402 by selecting the Done button; and (4) display "Help" information by selecting the Help button.

Figure 6D:
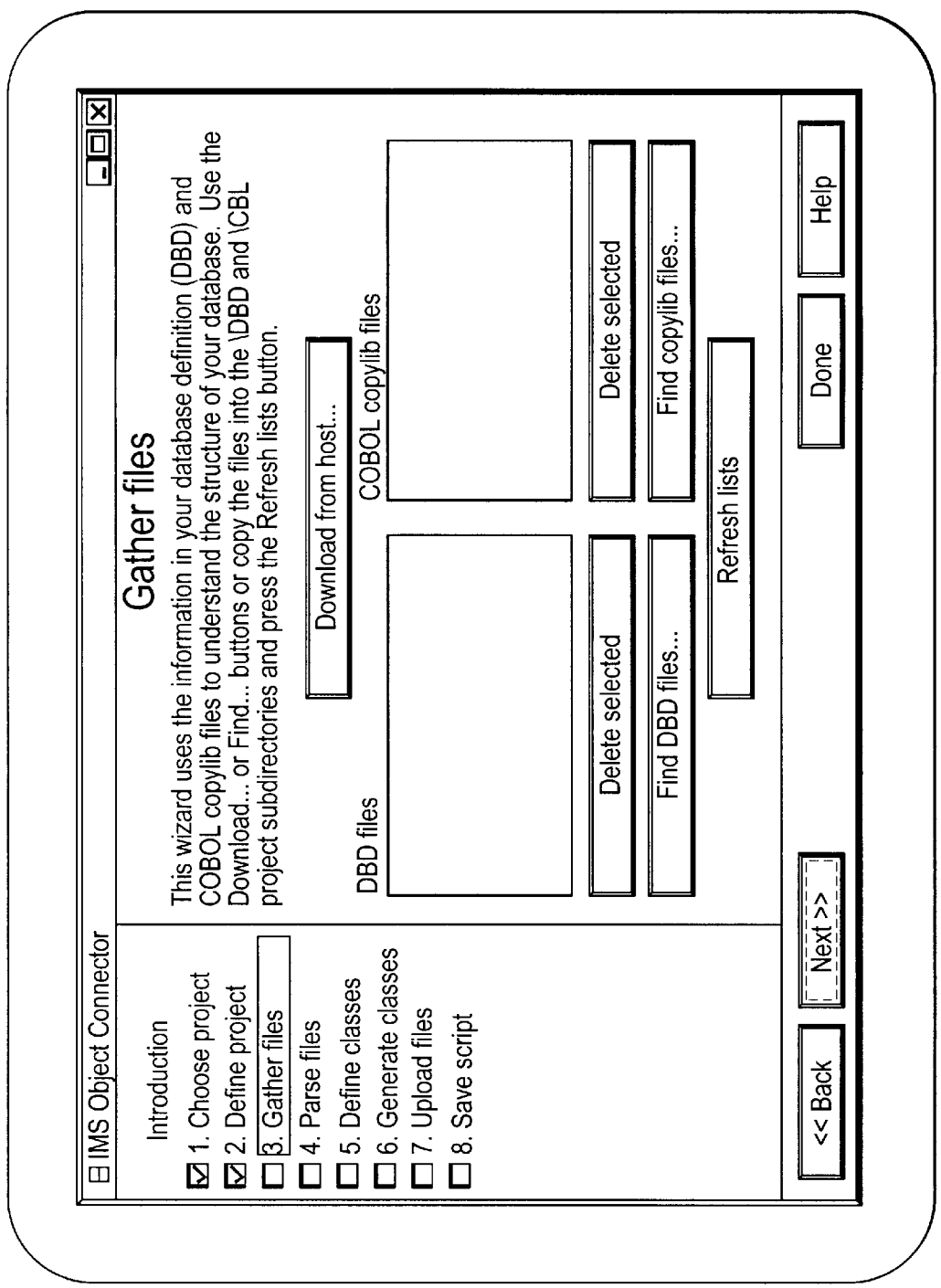

After selecting the Next button, the "Gather Files" page of FIG. 6D is displayed on the monitor of the client computer 100. This page provides the user interface for the database definer function 404 and is used by the user to specify the DBD files and COBOL copylib files to be used by the CDT 400 and stored in the catalog 404.

The page includes two list boxes for the DBD files and COBOL copylib files, respectively, and ten buttons, including the Download from host system, Deleted selected (DBD files), Find DBD files, Delete selected (COBOL Copylib files), Find copylib files, Refresh lists, Back, Next, Done, and Help buttons, which perform the following functions: (1) download files from the host system; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard 402 by selecting the Done button; and (10) display "Help" information by selecting the Help button.

Figure 6E:
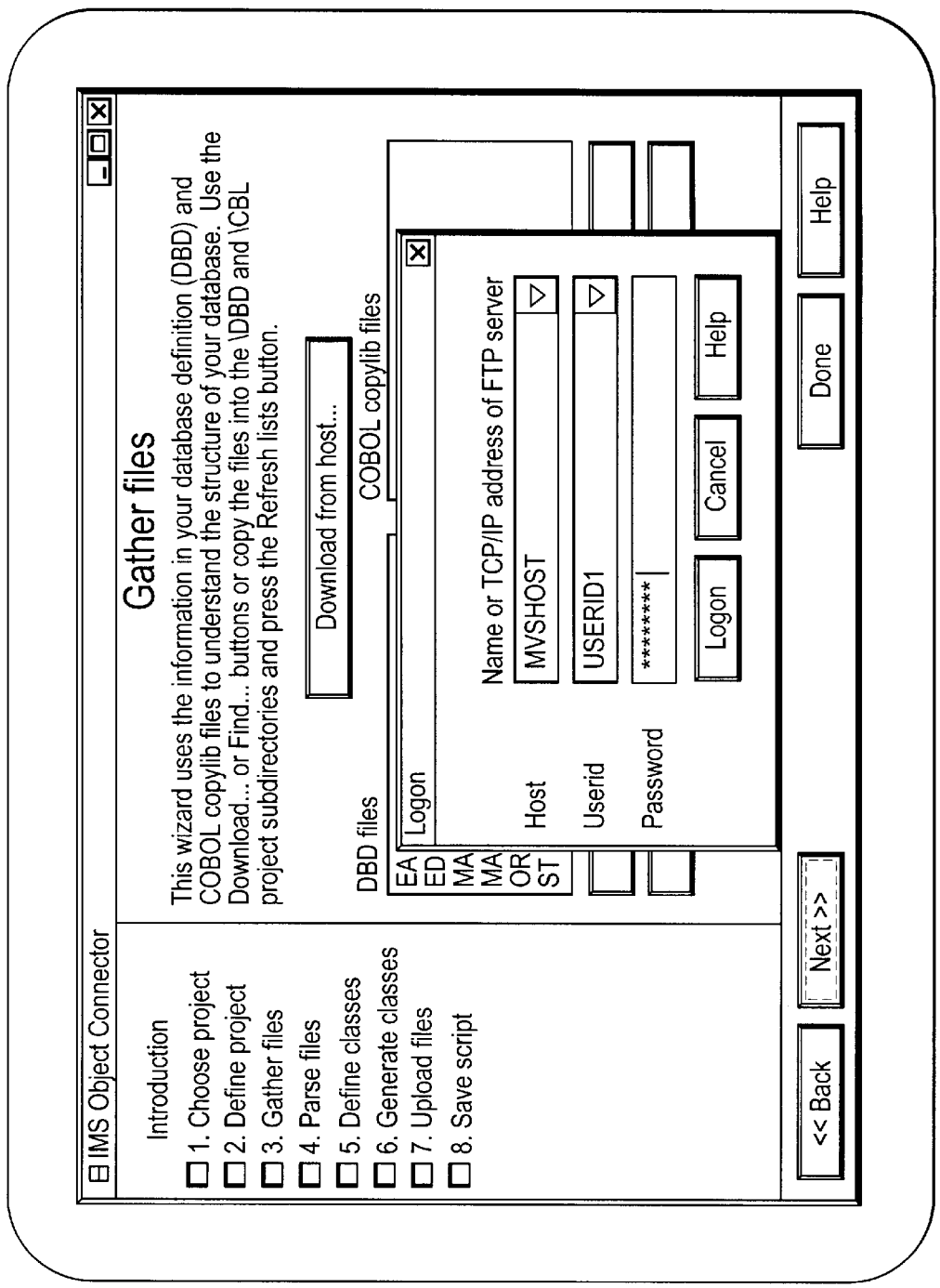

After selecting the Download from host button, the Logon page of FIG. 6E is displayed on the monitor of the client computer 100. This page also provides the user interface for the data definer function 404 and is used by the user to connect the host system for downloading the DBD files and COBOL copylib files to be stored in the catalog 404 by the CDT 400.

Figure 6F:
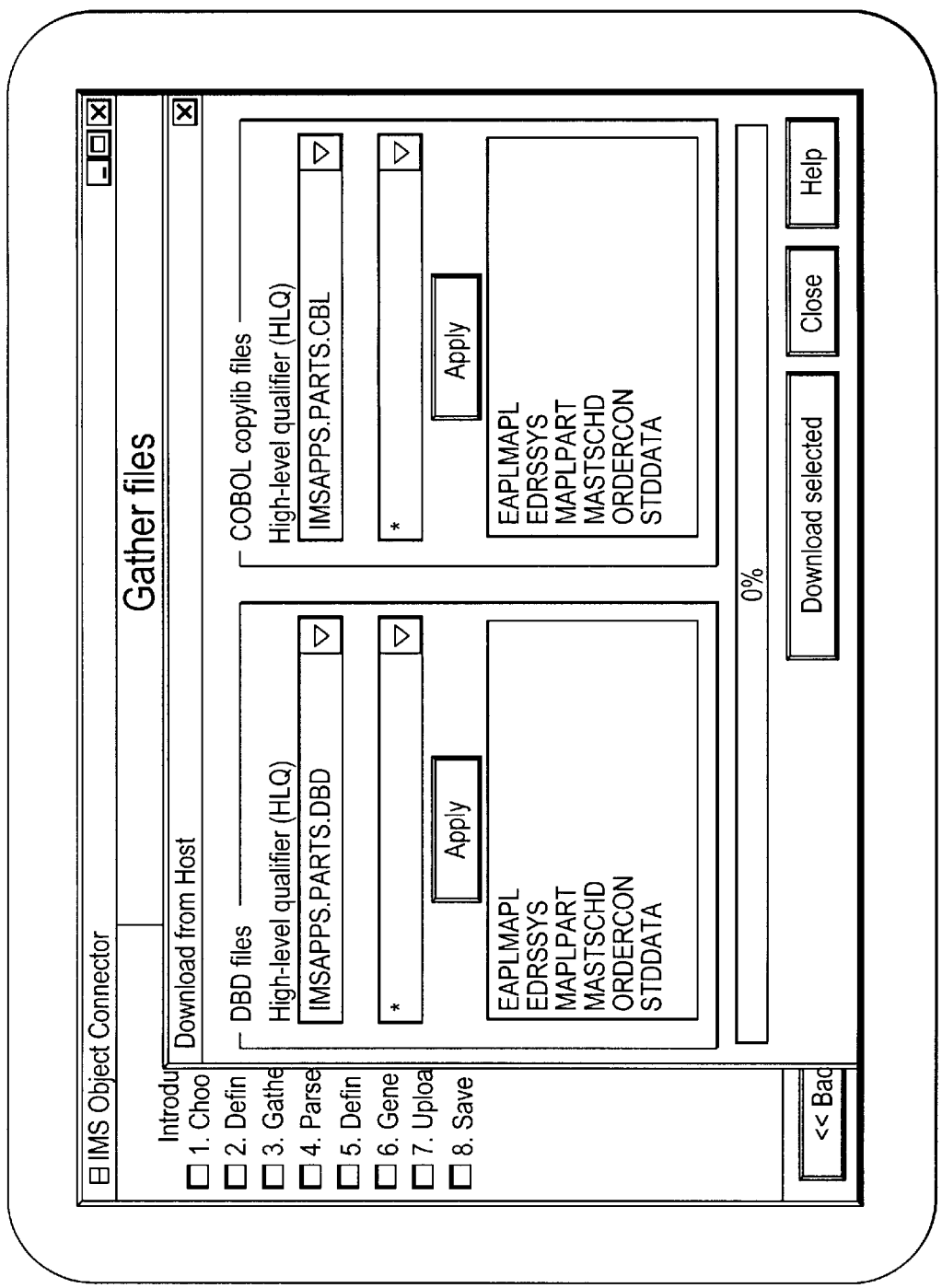

After entering the host system, userid, and password data in the three fields indicated in FIG. 6E, and selecting the Logon button, the Download from Host page of FIG. 6F is displayed on the monitor of the client computer 100. This page is used by the user to identify and select the DBD files and COBOL copylib files on the server 102 to be downloaded, stored, and used by the CDT 400.

The page includes two groups of three list boxes, wherein one group comprises list boxes to specify a high-level qualifier and search mask for DBD files and list the resulting DBD files and the other group comprises list boxes to specify a high-level qualifier and search mask for COBOL copylib files and list the resulting COBOL copylib files. The page also includes five buttons, including the Apply (BD files), Apply (COBOL copylib files), Download selected, Close, and Help buttons, which perform the following functions: (1) apply the specified high-level qualifier and search mask to a search for DBD files and list the resulting DBD files; (2) apply the specified high-level qualifier and search mask to a search for COBOL copylib files and list the resulting COBOL copylib files; (3) download any selected files in the lists of DBD files and COBOL copylib files; (4) close the page; and (5) display "Help" information by selecting the Help button.

Figure 6G:
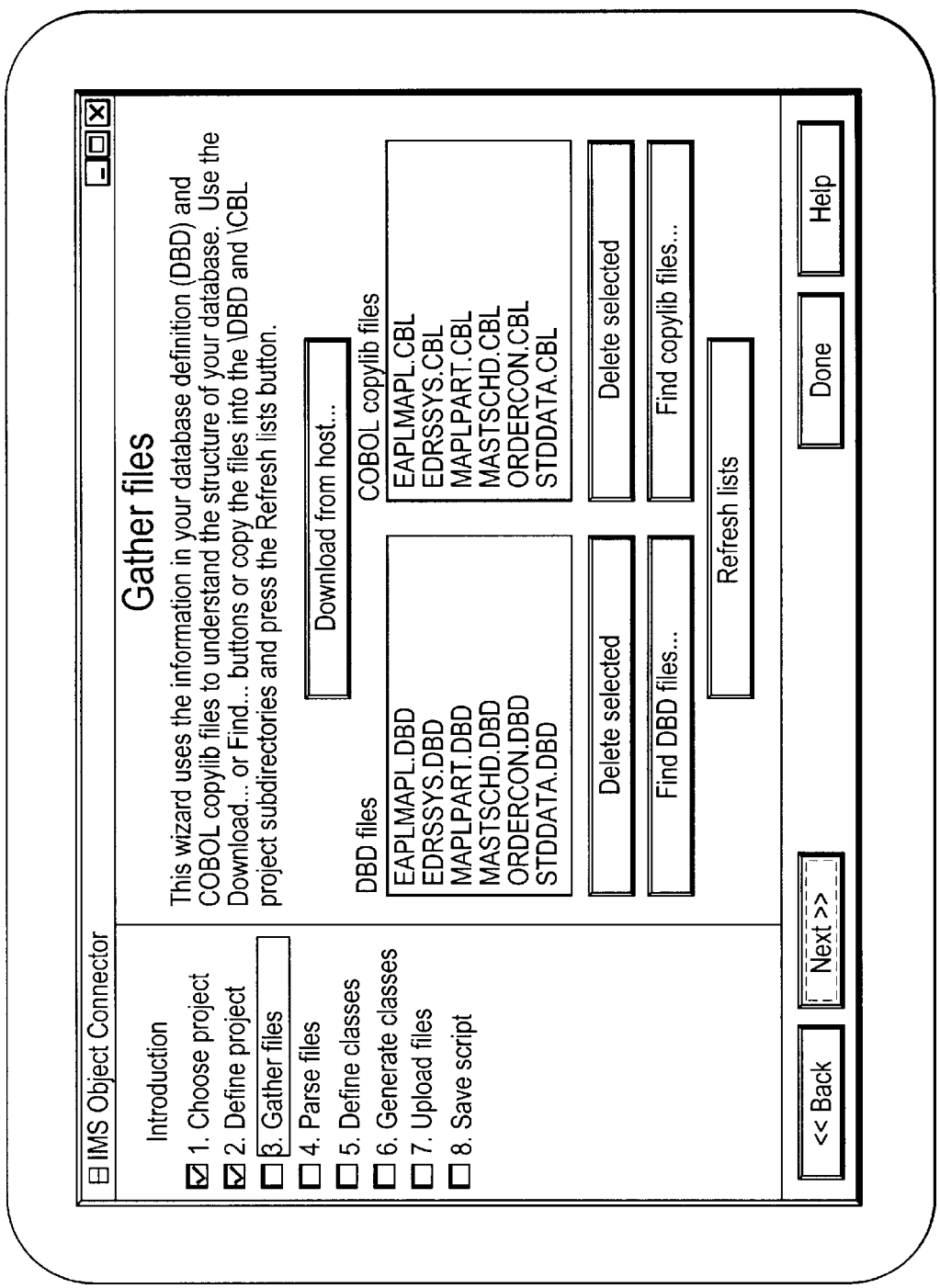

After selecting the Download selected button, the "Gather Files" page of FIG. 6G is displayed on the monitor of the client computer 100. After downloading any selected files in the lists of DBD files and COBOL copylib files from FIG. 6F, the list boxes in this page include the selected DBD files and COBOL copylib files stored in the catalog 404 that are to be used by the CDT 400.

As indicated above, the page includes ten buttons, including the Download from host, Deleted selected (DBD files), Find DBD files, Delete selected (COBOL Copylib files), Find copylib files, Refresh lists, Back, Next, Done, and Help buttons, which perform the following functions: (1) download files from the host system into the catalog 404; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard 402 by selecting the Done button; and (10) display "Help" information by selecting the Help button.

Figure 6H:
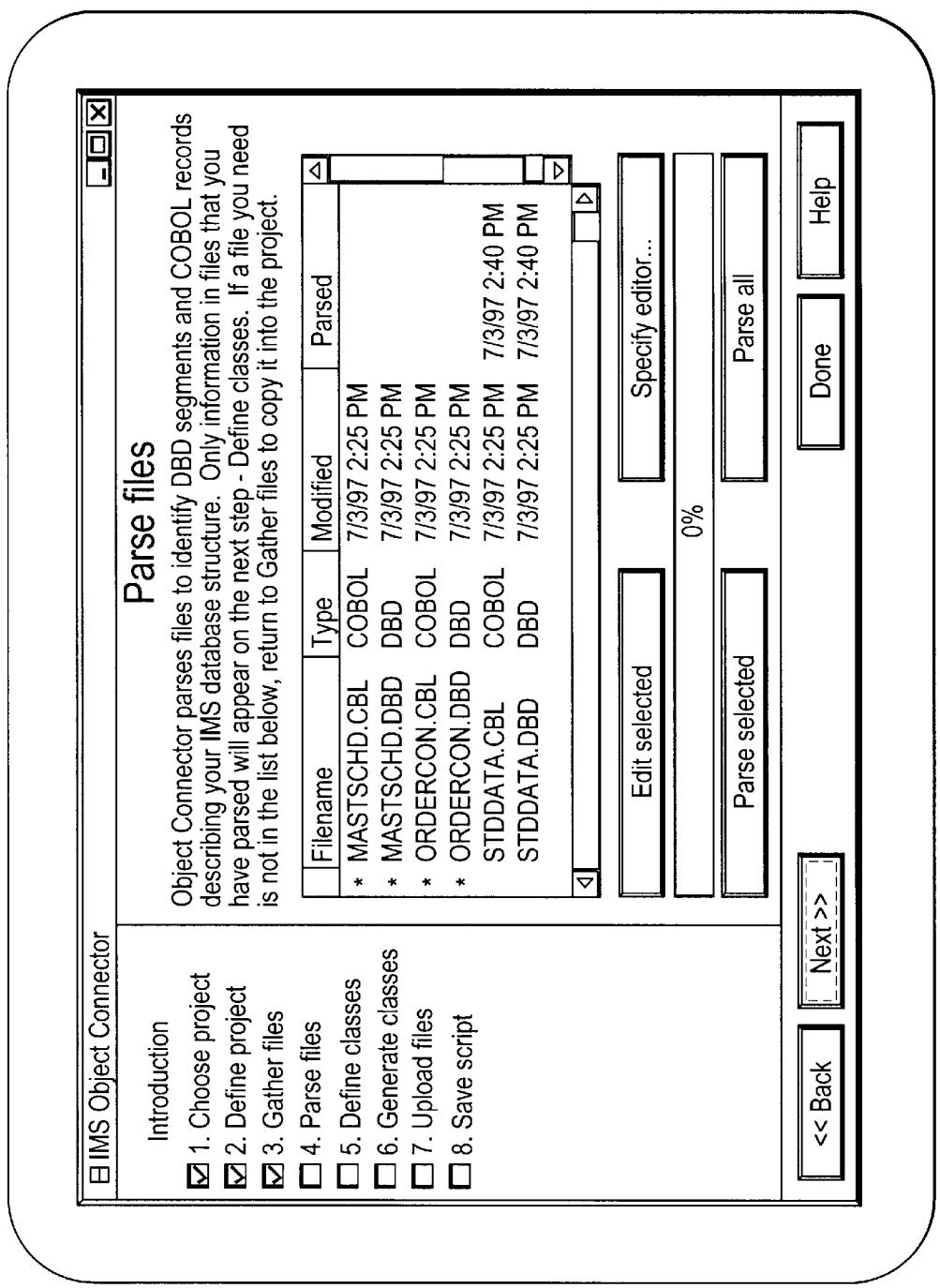

After selecting the Next button, the "Parse files" page of FIG. 6H is displayed on the monitor of the client computer 100. This page also provides the user interface for the database definer function 404 and is used by the user to specify the DBD files and COBOL copylib files from the Catalog 404 to be used by the CDT 400. The CDT 400 parses the selected files to identify DBD segments and COBOL records describing the structure of the IMS™ database 112. Only information in files that are parsed are defined as classes.

The page includes a list box of selected files and eight buttons, including the Edit selected, Specify editor, Parse selected, Parse all, Back, Next, Done, and Help buttons, which perform the following functions: (1) edit selected DBD files and COBOL copylib files; (2) specify the editor to use in step (1); (3) parse the selected files from the list box; (4) parse all of the files from the list box; (5) return to the previous step by selecting the Back button; (6) proceed to the next step by selecting the Next button; (7) terminate the Wizard 402 by selecting the Done button; and (8) display "Help" information by selecting the Help button. The page also includes a "progress" bar above both parse buttons to indicate the progress being made by either of the parse functions.

Figure 6I:
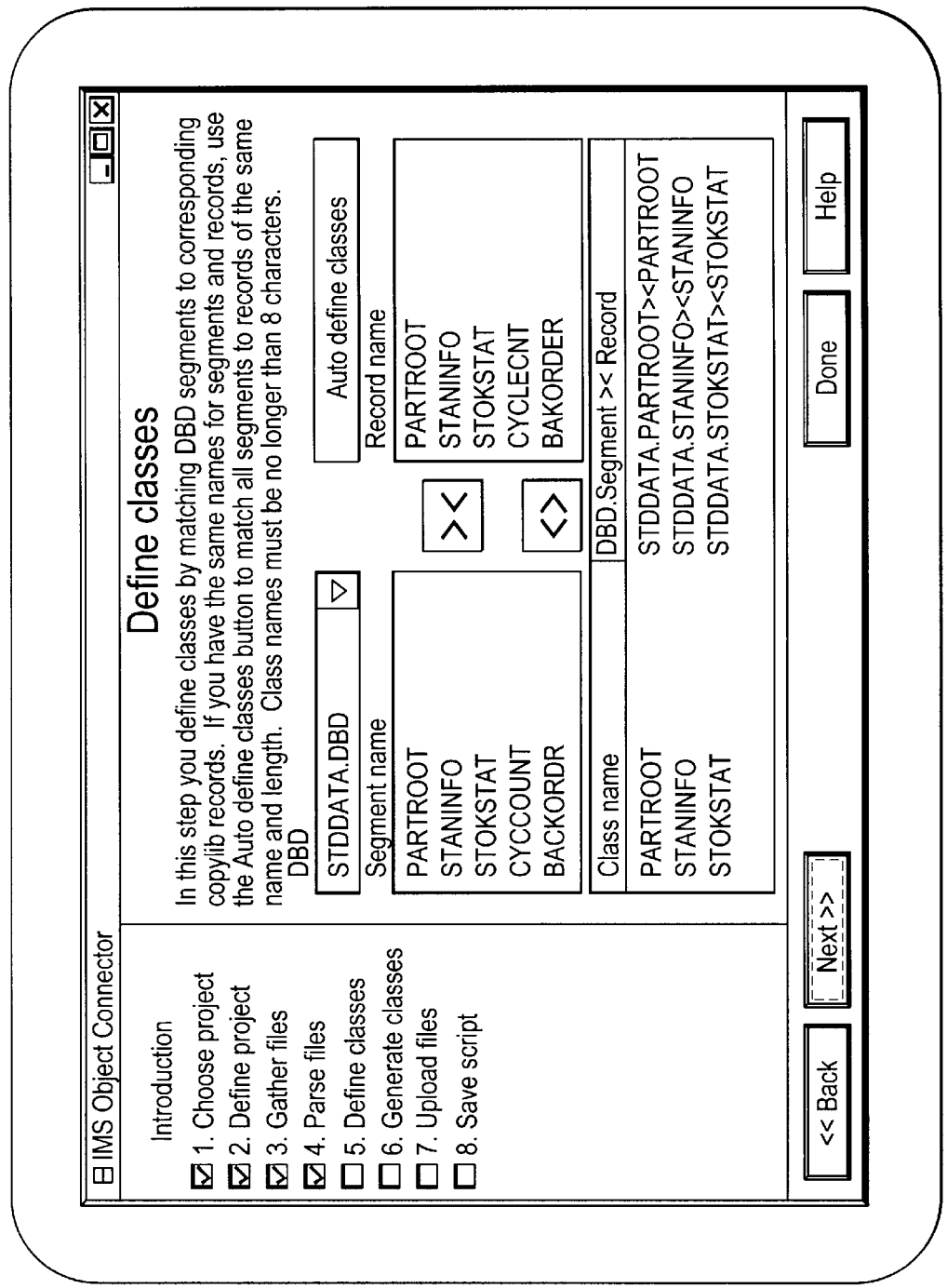

After selecting the Next button, the "Define classes" page of FIG. 6I is displayed on the monitor of the client computer 100. This page provides the user interface for the class definer function 408 and is used by the user to define classes by matching segments from the DBD files to corresponding records from the COBOL copylib files. If the same names are used for the segments and records, an "auto-define" function can be used to perform the matching function.

The page includes a list box of selected DBD files, a list box of segment names, a list box of record names, and a list box of class names. The page also includes seven buttons, including the Auto define classes, >< (associate names), <> (disassociate names), Back, Next, Done, and Help buttons, which perform the following functions: (1) auto-define the classes; (2) associate the names between the segment name and record name list boxes; (3) disassociate the names between the segment name and record name list boxes; (4) return to the previous step by selecting the Back button; (5) proceed to the next step by selecting the Next button; (6) terminate the Wizard 402 by selecting the Done button; and (7) display "Help" information by selecting the Help button.

Figure 6J:
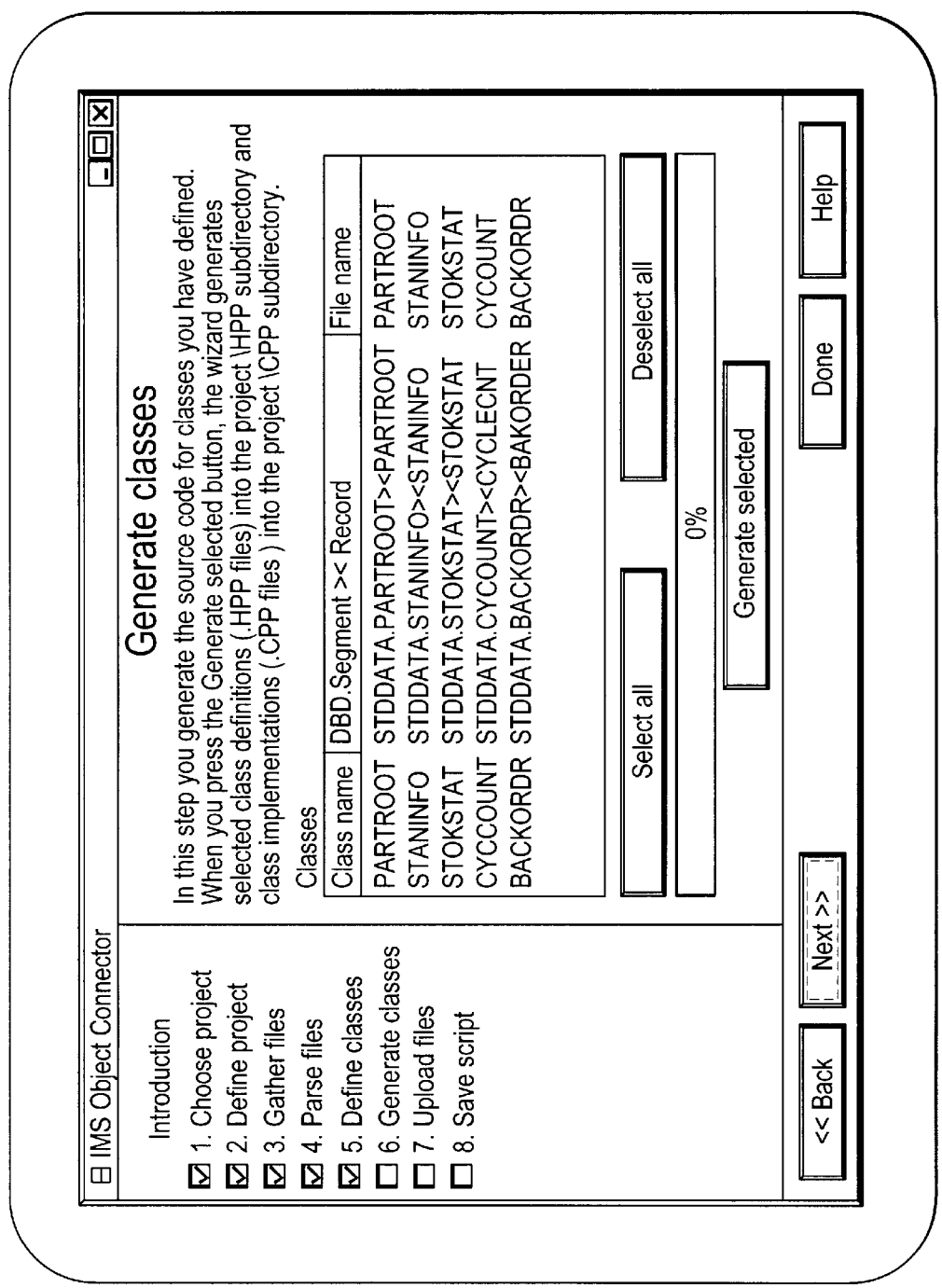

After selecting the Next button, the "Generate classes" page of FIG. 6J is displayed on the monitor of the client computer 100. This page provides the user interface for the class generator function 410 and web generator function 412, and is used to generate the source code for classes and web browser forms defined by matching segments from the DBD files to corresponding records from the COBOL copylib files. When the Generate button is selected, the Wizard 402 generates selected class definitions (.HPP files) into the "project\HPP" subdirectory, class implementations (.CPP files) into the "project\CPP" subdirectory, and web browser forms into the "project\FilesGen" subdirectory.

The page includes a list box of class names, related segment names and record names, file names for the generated source code. The page also includes seven buttons, including the Select all, Deselect all, Generate selected, Back, Next, Done, and Help buttons, which perform the following functions: (1) select all the classes in the list box; (2) deselect all the classes in the list box; (3) generate the class definitions and web browser forms for the selected classes; (4) return to the previous step by selecting the Back button; (5) proceed to the next step by selecting the Next button; (6) terminate the Wizard 402 by selecting the Done button; and (7) display "Help" information by selecting the Help button. The page also includes a "progress" bar above the Generate selected button to indicate the progress being made in generating the class definitions and web browser forms for the selected classes.

Figure 6K:
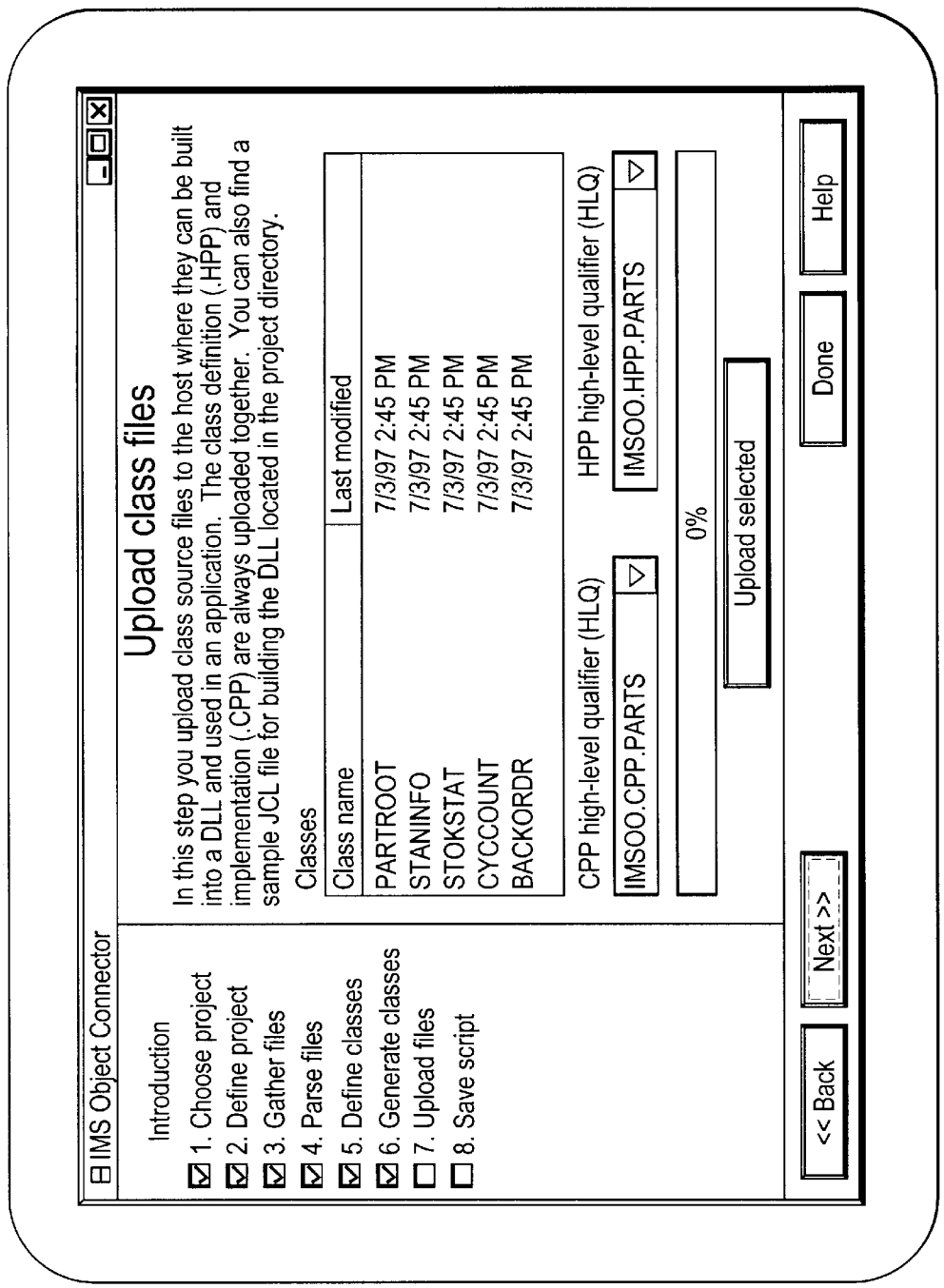

After selecting the Next button, the "Upload class files" page of FIG. 6K is displayed on the monitor of the client computer 100. This page is used to upload the source code for the class definitions and class implementations from the catalog 404 to the server computer 102, where they can be compiled into a runtime DLL that forms a part of the objects framework 108 for interfacing to the application program 106. (Note that web browser forms are not uploaded to the server computer 102; the forms are used for display on a client computer 102). Related class definitions and web browser forms (.HPP files) and class implementations (.CPP files) are uploaded together. Sample JCL (Job Control Language) for compiling the source code into the runtime DLL for the objects framework 108 is also located in the project directory.

The page includes a list box of file names for related class definitions (.HPP files) and class implementations (.CPP files), and list boxes for specifying a high-level qualifier for the .CPP files and for specifying a high-level qualifier for the .HPP files. The page also includes five buttons, including the Upload selected, Back, Next, Done, and Help buttons, which perform the following functions: (1) uploaded the class definitions (.HPP files) and class implementations (.CPP files) for the selected file name in the list box; (2) return to the previous step by selecting the Back button; (3) proceed to the next step by selecting the Next button; (4) terminate the Wizard 402 by selecting the Done button; and (5) display "Help" information by selecting the Help button. The page also includes a "progress" bar above the Upload selected button to indicate the progress being made in uploading the class definitions (.HPP files) and class implementations (.CPP files) for the selected file name.

Figure 6L:
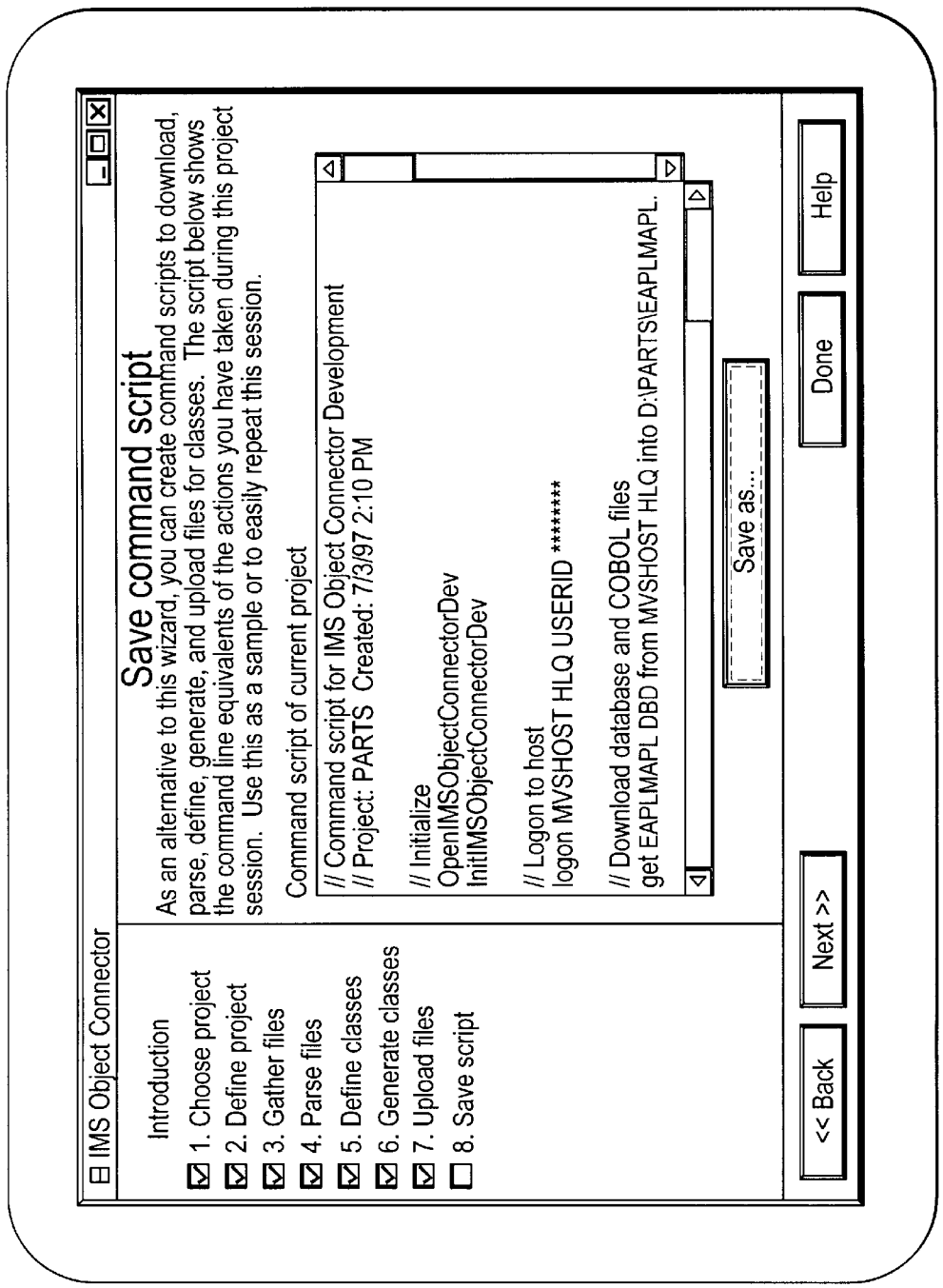

After selecting the Next button, the "Save command script" page of FIG. 6L is displayed on the monitor of the client computer 100. This page is used to create command scripts, as an alternative to using the IMS™ Object Connector Class Wizard 402, for performing the above downloading, parsing, defining, generating and uploading steps related to the construction of class definitions and implementations.

The page includes a text area showing the command script for the current project, wherein the text area includes vertical and horizontal scroll bars. The page also includes five buttons, including the Save as, Back, Next, Done, and Help buttons, which perform the following functions: (1) save the command script as a specified file; (2) return to the previous step by selecting the Back button; (3) proceed to the next step by selecting the Next button; (4) terminate the Wizard 402 by selecting the Done button; and (5) display "Help" information by selecting the Help button.

Logic of the IMS™ Object Connector Class Wizard

Figure 7:
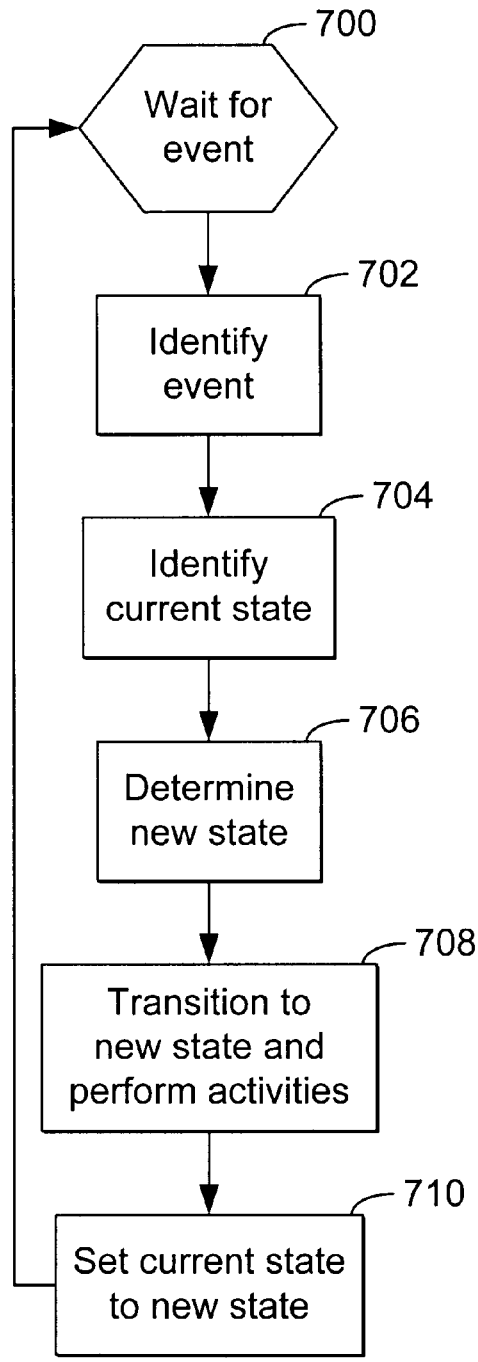
FIGS. 7 and 8 are flowcharts that illustrate the logic of the IMS™ Object Connector Class Wizard according to the present invention.
Figure 8:
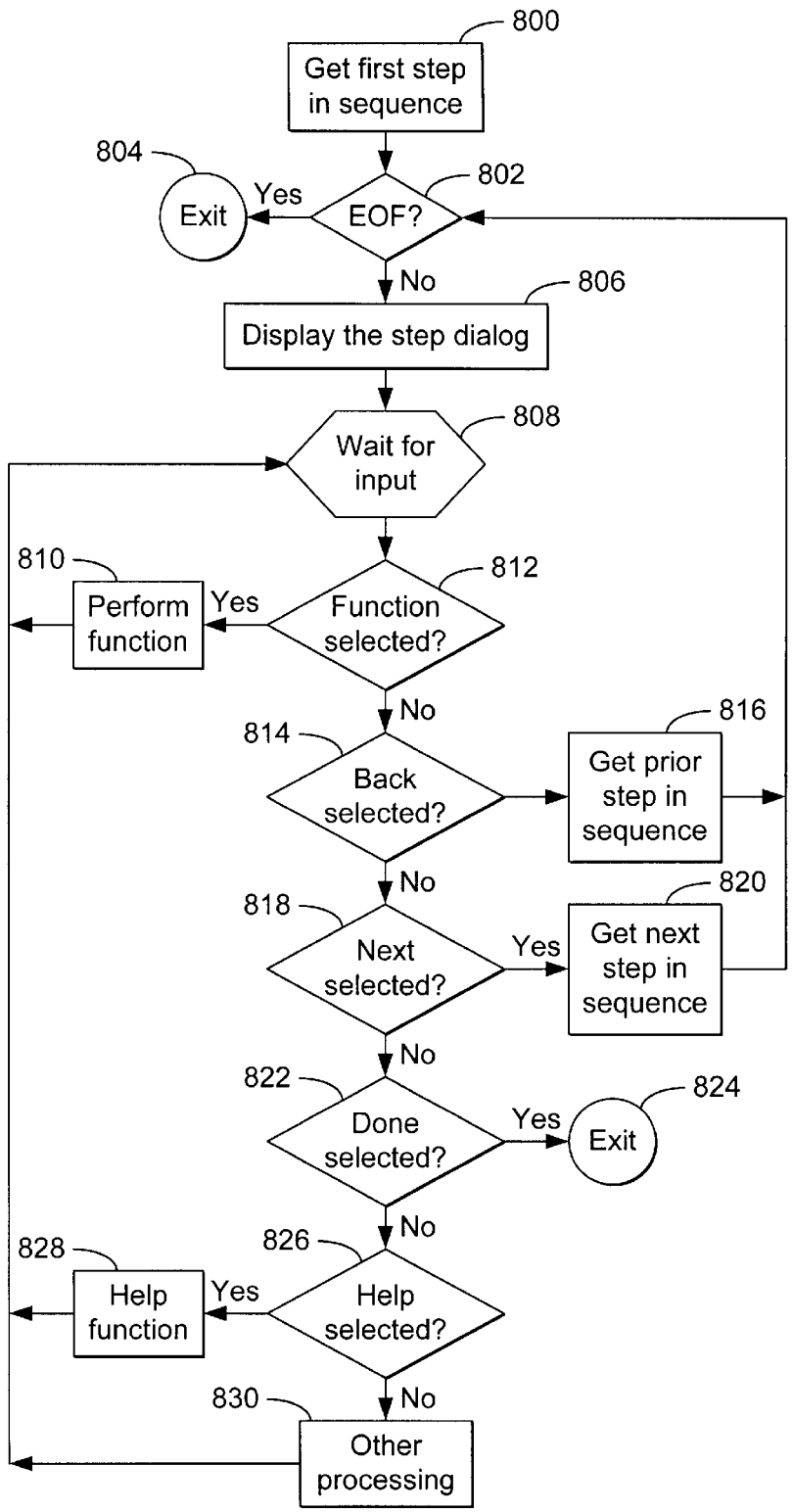

Flowcharts which illustrate the logic of the IMS™ Object Connector Class Wizard 402 of the present invention are shown in FIGS. 7 and 8. Those skilled in the art will recognize that this logic is provided for illustrative purposes only and that different logic may be used to accomplish the same results.

In the preferred embodiment, the various operations described below are specifically related to the IMS™ Object Connector Class Wizard 402 of the CDT 400. Of course, those skilled in the art will recognize that other functions could be used in the IMS™ Object Connector Class Wizard 402 without departing from the scope of the present invention.

FIG. 7 is a flowchart that illustrates the general logic of a message or event-driven CDT 400 performing the steps of the present invention. In such a CDT 400, operations are performed when transitions are made, based upon the receipt of messages or events, from present or current states to new states.

Generally, the flowchart begins by waiting at block 700 for an event (e.g., a mouse button click). It should be appreciated that during this time, other tasks, e.g., by the operating system or other computer programs, may also be carried out. When an event occurs, control passes to block 702 to identify the event. Based upon the event, as well as the current state of the system determined in block 704, a new state is determined in block 706. In block 708, the logic transitions to the new state and performs any actions required for the transition. In block 710, the current state is set to the previously determined new state, and control returns to block 700 to wait for more input events.

The specific operations that are performed by block 708 when transitioning between states will vary depending upon the current state and the event. The various operations required to implement and maintain the IMS™ Object Connector Class Wizard 402 of the present invention represent particular events handled by the logic. However, it should be appreciated that these operations represent merely a subset of all of the events handled by the computer 100.

FIG. 8 is a flowchart that illustrates the general logic to perform a sequence of steps for the IMS™ Object Connector Class Wizard 402. The logic begins at block 800 when control transfers from FIG. 7 after the IMS™ Object Connector Class Wizard 402 is invoked or selected by the user. Block 800 represents the computer 100 retrieving the first step in the sequence of pages (e.g., FIG. 6A) associated with the IMS™ Object Connector Class Wizard 402. Block 802 is a decision block that represents the computer 100 determining whether there are no more steps in the sequence associated with the IMS™ Object Connector Class Wizard 402. If so, control transfers to Block 804 to terminate the logic of the IMS™ Object Connector Class Wizard 402; otherwise, control transfers to Block 806.

Block 806 represents the computer 100 displaying the step page on the monitor. Block 808 represents the computer 100 waiting for user input (e.g., a mouse button click signifying selection of a function). Thereafter, control passes to blocks 810–830 to identify the input and perform associated functions.

Block 810 is a decision block that represents the computer 100 determining whether the user input is a function selected from the step page. If so, control transfers to Block 812; otherwise, control transfers to Block 814. Block 812 represents the computer 100 performing the selected function, e.g., any of the functions or group of functions described above in conjunction with FIGS. 6A–6K excluding the functions associated with the Back, Next, Done, and Help buttons. Thereafter, control transfers back to Block 808.

Block 814 is a decision block that represents the computer 100 determining whether the user input is a "Back" function selected from the page. If so, control transfers to Block 816; otherwise, control transfers to Block 818. Block 816 represents the computer 100 retrieving the prior step page in the sequence. Thereafter, control transfers back to Block 802.

Block 818 is a decision block that represents the computer 100 determining whether the user input is a "Next" function selected from the page. If so, control transfers to Block 820; otherwise, control transfers to Block 822. Block 820 represents the computer 100 retrieving the next step page in the sequence. Thereafter, control transfers back to Block 802.

Block 822 is a decision block that represents the computer 100 determining whether the user input is a "Done" function selected from the page. If so, control transfers to Block 824; otherwise, control transfers to Block 826. Block 824 represents the computer 100 terminating the logic of the IMS™ Object Connector Class Wizard 402.

Block 826 is a decision block that represents the computer 100 determining whether the user input is a "Help" function selected from the page. If so, control transfers to Block 828; otherwise, control transfers to Block 830. Block 828 represents the computer 100 performing the Help function. Thereafter, control transfers back to Block 808.

Block 830 represents the computer 100 performing other processing for other user input. Thereafter, control transfers back to Block 808.

Operation of the IMS™ Object Connector Class Command Line Interface

In addition to the IMS™ Object Connector Class Wizard 402, users also have available the IMS™ Object Connector Class Command Line Interface (CLI) 403 that may also be displayed on the monitor of the client computer 100 by the CDT 400 in one embodiment of the present invention.

Using the CLI 403, the user can enter commands one by one, or can run a command script that contains all of the commands. The CLI 403 is not a shell, and therefore, normal DOS commands (such as ftp and dir) are not recognized. To begin using the command-line interface, the user goes to the directory in which the product was installed, and enters the command "IOCCLI." A command prompt, such as "COMMAND >>", is then displayed on the monitor and the user can begin entering CDT 400 commands.

The commands that can be entered include the following:

Batch processing command (RUNSCRIPT)

Project management commands (CREATE, OPEN, DELETE)

Commands for connecting to host system (LOGIN, DISCONNECT)

File management commands (CD, GETFILE)

Commands for creating classes (PARSE, DEFINECLASS, GENERATE)

Command for uploading classes to the host system (UPLOAD)

Command for exiting the CLI 403 and to save a script file (QUIT)

Those skilled in the art will recognize that this set of commands is provided for illustrative purposes only and that different commands may be used to accomplish the same functions and results.

When entering the commands, the follow rules are used to ensure proper syntax and command order:

The CREATE or OPEN command is used to create or open a project before entering any of the other commands. If other commands are entered before specifying a project, all files will be placed in the working directory.

The commands for downloading and uploading files from the server computer 102 (LOGIN, CD, GETFILE, UPLOAD, and DISCONNECT) can be entered at any time. However, CD, GETFILE, and DISCONNECT commands can be entered only after logging onto the server computer 102.

The PARSE command must be entered before using the DEFINECLASS and GENERATE commands, although they can be entered in separate sessions.

RUNSCRIPT

The RUNSCRIPT command runs a file that contains all of the necessary commands. A command script can be created either by using the CDT 400 GUI 402 or by saving the script when prompted while using the QUIT command. The option of allowing for batch processing with the RUNSCRIPT command means the user no longer has to go through all the panels of the CDT 400 GUI 402 and can simply modify script files (or write their own) and run them through the CLI 403. In theory, this should save them a lot of time (the user may not want to go through all the GUI 402 panels for each database if they have a substantial number of databases). Users can also concatenate several script files into one and just run that single file through the CLI.

The syntax of the RUNSCRIPT command is described below:

>>RUNSCRIPT SOURCE=source_dir FILENAME= filename or

>>RUN SRC=source_dir FN=filename wherein:

source_dir is the directory where the command script file is located, and filename is the name of the command script.

LOGIN

The LOGIN command connects to the server computer 102 for uploading and downloading files.

The syntax of the LOGIN command is described below:

>>LOGIN HOSTNAME=host_name USERID=userid or

>>LOG HN=host_name UID=userid wherein:

host_name is the name of the host system, e.g., the server computer 102, and userid is the user id for host system.

DISCONNECT

The DISCONNECT command disconnects from the host system and ends the associated FTP session.

The syntax of the DISCONNECT command is described below:

>>DISCONNECT or

>>DIS

CREATE

The CREATE command creates a project directory.

The syntax of the CREATE command is described below:

>>CREATE PROJDIR=project_directory PROJNAME= project_name or

>>CR PD=propject_directory PN=project_name wherein:

project_directory is the directory where the project files are to be stored (if directory does not exist, it will be created), and project_name is the name of the project to be created.

OPEN

The OPEN command opens a project directory.

The syntax of the OPEN command is described below:

>>OPEN PROJDIR=project_directory PROJNAME= project_name or

>>OP PD=propject_directory PN=project_name wherein:

project_directory is the directory where the project files are stored, and project_name is the name of the project.

DELETE

The DELETE command deletes a project directory.

The syntax of the DELETE command is described below:

>>DELETE PROJDIR=project_directory PROJNAME= project_name or

>>DEL PD=propject_directory PN=project_name wherein:

project_directory is the directory where the project files are stored, and project_name is the name of the project to be deleted.

CD

The CD command specifies the high level qualifier for the MVS partitioned data set (PDS) that contains the files being downloaded.

The syntax of the CD command is described below:

>>-CD HLQ=mvs_hlq wherein:

mvs_hlq is the high level qualifier for the MVS PDS that contains the files host system.

GETFILE

The GETFILE command downloads the selected from the host system to the project directory.

The syntax of the GETFILE command is described below:

>>GETFILE FILENAME=filename EXTENSION= extension or

>>GET FN=filename EXT=extension wherein:

filename is the name of the file to be downloaded, and extension is the file type, i.e., DBD (database definition) or CBL (COBOL copylib).

PARSE

The PARSE command parses eligible files in a specified directory.

The syntax of the PARSE command is described below:

>>PARSE SOURCE=source_dir FILENAME=filename or

>>PA SRC=source_dir FN=filename wherein:

source_dir is the directory where the file is located, and filename is the name of the file to be parsed.

DEPINECLASS

The DEFINECLASS command establishes an association between a segment type that is defined in a DBD file and a COBOL copylib. A class name for this association is created and stored in the catalog 404.

The syntax of the DEFINECLASS command is described below:

>>DEFINECLASS CLASSNAME=classname
DBDNAME=dbdname
SEGMENTNAME=segmentname
RECORDNAME=recordname
BASECLASSNAME=baseclassname or >>DEF CN=classname
DN=dbdname
SN=segmentname
RN=recordname
BN=baseclassname wherein:

classname is the name of the new class assigned to the collection of data and methods, dbdname is the name of the DBD file in which the segment is stored,, segmentname is the name of the segment to be associated with the COBOL copylib record, recordname is the name of the COBOL copylib record with which the segment is associated, and baseclassname is the name of the class from which the new class will inherit characteristics.

GENERATE

The GENERATE command creates the classes based on the information that is specified in the DEFINECLASS command.

The syntax of the GENERATE command is described below:

>>GENERATE CLASSNAME=dassname TARGET= target_directory or

>>GEN CN=classname TAR=target_directory wherein:

classname is the name of the new class assigned to the collection of data and methods, and target_directory is the name of the directory where the generated C++ classes are to be stored.

QUIT

The QUIT command terminates the CLI session.

The syntax of the QUIT command is described below:

>>QUIT or

>>QU

Logic of the IMS™ Object Connector Class Command Line Interface

Figure 9:
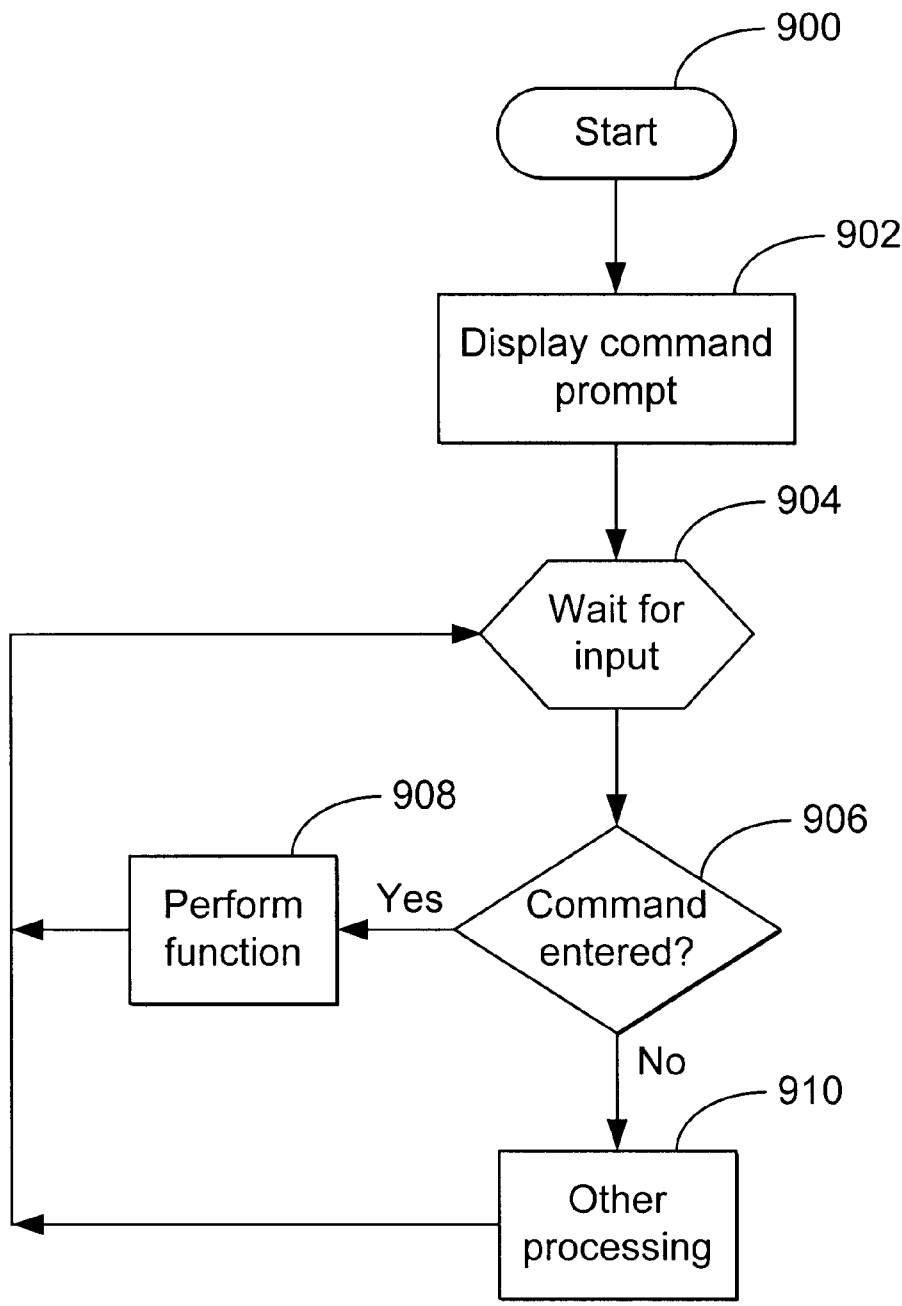
FIG. 9 is a flowchart that illustrates the logic of the IMS™ Object Connector Class Command Line Interface according to the present invention.

FIG. 9 is a flowchart that illustrates the general logic to perform a sequence of steps for the IMS™ Object Connector Class CLI 403. Those skilled in the art will recognize that this logic is provided for illustrative purposes only and that different logic may be used to accomplish the same results.

The logic begins at block 900 when control transfers from FIG. 7 after the IMS™ Object Connector Class CLI 403 is invoked or selected by the user.

Block 902 represents the computer 100 displaying the prompt on the monitor.

Block 904 represents the computer 100 waiting for user input (e.g., a command signifying invocation of a function). Thereafter, control passes to blocks 906–908 to identify the input and perform associated functions.

Block 906 is a decision block that represents the computer 100 determining whether the user input is one of the specified commands RUNSCRIPT, CREATE, OPEN, DELETE, LOGIN, DISCONNECT, CD, GETFILE, PARSE, DEFINECLASS, GENERATE, UPLOAD or QUIT. If so, control transfers to Block 908; otherwise, control transfers to Block 910.

Block 908 represents the computer 100 performing the selected function, e.g., the functions associated with the entered command. Thereafter, control transfers back to Block 904

Block 910 represents the computer 100 performing other processing for other user input. Thereafter, control transfers back to Block 904.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for generating class specifications for an object-oriented application that accesses a hierarchical database. The class specifications are generated using a command line interface of a class definition tool. A database description and a record layout associated with the hierarchical database are captured and associated to define a specification for the database. Class definitions are then generated from the database specification, wherein the class definitions are instantiated as objects in the objects framework that encapsulate data retrieved from the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for generating an application program for accessing a hierarchical database, comprising the steps of:
   (a) accepting one or more operator commands into a computer using a command line interface, wherein the operator commands are selected from a group of operator commands comprising:
      (1) a first command instructing the computer to capture a database description associated with the hierarchical database;
      (2) a second command instructing the computer to capture a record layout associated with the hierarchical database;
      (3) a third command instructing the computer to associate the database description with the record layout to define a specification for the hierarchical database; and
      (4) a fourth command instructing the computer to generate one or more class definitions from the database specification, wherein the class definitions are instantiated as objects in an objects framework that encapsulate data retrieved from the hierarchical database.

2. The method of claim 1, further comprising the step of storing the database specification in a catalog.

3. The method of claim 1, wherein the objects framework comprises a class library that interfaces to the application program.

4. The method of claim 1, wherein the operator can enter the operator commands one by one.

5. The method of claim 1, wherein the operator can execute a command script that contains all of the operator commands.

6. The method of claim 1, wherein the group of commands further includes one or more of the following:
   a batch processing command,
   a project management command,
   a command for connecting to a host system,
   a command for disconnecting from the host system,
   a file management command,
   a command for creating the class specifications,
   a command for uploading the class specifications to the host system,
   a command for exiting the command line interface, and
   a command to save a command script file.

7. The method of claim 6, wherein the batch processing command executes the command script file.

8. The method of claim 6, wherein the project management command creates or opens a project.

9. The method of claim 6, wherein the file management command uploads or downloads files.

10. The method of claim 6, wherein the command for creating the class specifications comprises a command that establishes an association between a segment type that is defined in the database description and the record layout.

11. A computerized apparatus for generating an application program for accessing a hierarchical database, comprising:
   (a) a computer; and
   (b) means, performed by the computer, for accepting one or more operator commands into a computer using a command line interface, wherein the operator commands are selected from a group of operator commands comprising:
      (1) a first command instructing the computer to capture a database description associated with the hierarchical database;
      (2) a second command instructing the computer to capture a record layout associated with the hierarchical database;
      (3) a third command instructing the computer to associate the database description with the record layout to define a specification for the hierarchical database; and
      (4) a fourth command instructing the computer to generate one or more class definitions from the database specification, wherein the class definitions are instantiated as objects in an objects framework that encapsulate data retrieved from the hierarchical database.

12. The apparatus of claim 11, further comprising means for storing the database specification in a catalog.

13. The apparatus of claim 11, wherein the objects framework comprises a class library that interfaces to the application program.

14. The apparatus of claim 11, wherein the operator can enter the operator commands one by one.

15. The apparatus of claim 11, wherein the operator can execute a command script that contains all of the operator commands.

16. The apparatus of claim 11, wherein the group of commands further includes one or more of the following:
   a batch processing command,
   a project management command,
   a command for connecting to a host system,
   a command for disconnecting from the host system,
   a file management command,
   a command for creating the class specifications,
   a command for uploading the class specifications to the host system,
   a command for exiting the command line interface, and
   a command to save a command script file.

17. The apparatus of claim 16, wherein the batch processing command executes the command script file.

18. The apparatus of claim 16, wherein the project management command creates or opens a project.

19. The apparatus of claim 16, wherein the file management command uploads or downloads files.

20. The apparatus of claim 16, wherein the command for creating the class specifications comprises a command that establishes an association between a segment type that is defined in the database description and the record layout.

21. A program storage medium, readable by a computer, embodying one or more instructions executable by the computer to perform method steps for accessing a hierarchical database, the method comprising the steps of:

(a) accepting one or more operator commands into a computer using a command line interface, wherein the operator commands are selected from a group of operator commands comprising:

(1) a first command instructing the computer to capture a database description associated with the hierarchical database;

(2) a second command instructing the computer to capture a record layout associated with the hierarchical database;

(3) a third command instructing the computer to associate the database description with the record layout to define a specification for the hierarchical database; and (4) a fourth command instructing the computer to generate one or more class definitions from the database specification, wherein the class definitions are instantiated as objects in an objects framework that encapsulate data retrieved from the hierarchical database.

22. The method of claim 21, further comprising the step of storing the database specification in a catalog.

23. The method of claim 21, wherein the objects framework comprises a class library that interfaces to the application program.

24. The method of claim 21, wherein the operator can enter the operator commands one by one.

25. The method of claim 21, wherein the operator can execute a command script that contains all of the operator commands.

26. The method of claim 21, wherein the group of commands further includes one or more of the following:

a batch processing command, a project management command, a command for connecting to a host system, a command for disconnecting from the host system, a file management command, a command for creating the class specifications, a command for uploading the class specifications to the host system, a command for exiting the command line interface, and a command to save a command script file.

27. The method of claim 26, wherein the batch processing command executes the command script file.

28. The method of claim 26, wherein the project management command creates or opens a project.

29. The method of claim 26, wherein the file management command uploads or downloads files.

30. The method of claim 26, wherein the command for creating the class specifications comprises a command that establishes an association between a segment type that is defined in the database description and the record layout.

* * * * *

UNITED STATES PATENT AND TRADEMARK OFFICE
CERTIFICATE OF CORRECTION

PATENT NO. : 6,141,660
DATED : October 31, 2000
INVENTOR(S) : Mark A. Bach, Kyle Jeffrey Charlet, Shyh-Mei Fang Ho, Kevin M. McBride, Huey Moncrief Rowe-Anderson, Thomas Beavers Sander, and Thomas Arthur Vogel It is certified that error appears in the above-identified patent and that said Letters Patent is hereby corrected as shown below:

<u>Title page,</u>
Item [57], ABSTRACT,
Before "framework", "the objects" should read -- an object --.

<u>Column 21,</u>
Line 47, before "framework", "objects" should read -- object --.

<u>Column 22,</u>
Line 38, before "framework", "objects" should read -- object --.

<u>Column 23,</u>
Line 28, before "framework", "objects" should read -- object --.

Signed and Sealed this

Twenty-ninth Day of October, 2002

*Attest:*

*Attesting Officer*

JAMES E. ROGAN
*Director of the United States Patent and Trademark Office*